United States Patent
Shimada et al.

(10) Patent No.: US 6,690,404 B2
(45) Date of Patent: *Feb. 10, 2004

(54) IMAGE FORMING APPARATUS AND METHOD FOR CHANGEABLE IMAGE FORMING MODES BETWEEN A SINGLE COLOR MODE AND A MULTIPLE COLOR MODE

(75) Inventors: Kazuyuki Shimada, Cyohu; Tomohiro Nakajima, Machida, both of (JP)

(73) Assignee: Ricoh Company, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/538,508

(22) Filed: Mar. 30, 2000

(65) Prior Publication Data
US 2003/0035042 A1 Feb. 20, 2003

(30) Foreign Application Priority Data

Mar. 30, 1999 (JP) .............................. 11-087855

(51) Int. Cl.⁷ .......................... G03G 15/01; G03G 15/04
(52) U.S. Cl. ......................... 347/115; 347/118; 347/232
(58) Field of Search ................................ 347/115, 116, 347/118, 232; 399/299, 301; 359/204

(56) References Cited

U.S. PATENT DOCUMENTS

| 4,835,582 A | | 5/1989 | Kasahara et al. |
| 4,862,214 A | | 8/1989 | Kasahara et al. |
| 4,864,358 A | | 9/1989 | Kasahara |
| 4,872,037 A | | 10/1989 | Kasahara et al. |
| 4,928,144 A | | 5/1990 | Kasahara et al. |
| 5,753,907 A | | 5/1998 | Nakajima et al. |
| 5,784,094 A | * | 7/1998 | Ota et al. |
| 5,896,472 A | * | 4/1999 | Takayama ............... 347/116 X |
| 6,029,023 A | * | 2/2000 | Munemori et al. ..... 399/299 X |
| 6,029,033 A | * | 2/2000 | Kawasaki ............... 399/299 X |
| 6,049,350 A | * | 4/2000 | Yamaguchi ............. 347/232 X |
| 6,188,419 B1 | * | 2/2001 | Katamoto et al. |

FOREIGN PATENT DOCUMENTS

| JP | 04-284468 | | 10/1992 |
| JP | 5-150607 | * | 6/1993 |
| JP | 10-307443 | | 11/1998 |

* cited by examiner

Primary Examiner—Joan Pendegrass
(74) Attorney, Agent, or Firm—Oblon, Spivak, McClelland, Maier & Neustadt, P.C.

(57) ABSTRACT

An optical system for an image forming apparatus which a first light source for selectably emitting a plurality of image forming light beams based upon control signals and a second light source for emitting image forming light beams of a number of less than that of said first light source. The first light source of the optical system selectably emitting multiple light beams and a single beam, e.g. selectably emits two beams and a single beam.

25 Claims, 20 Drawing Sheets

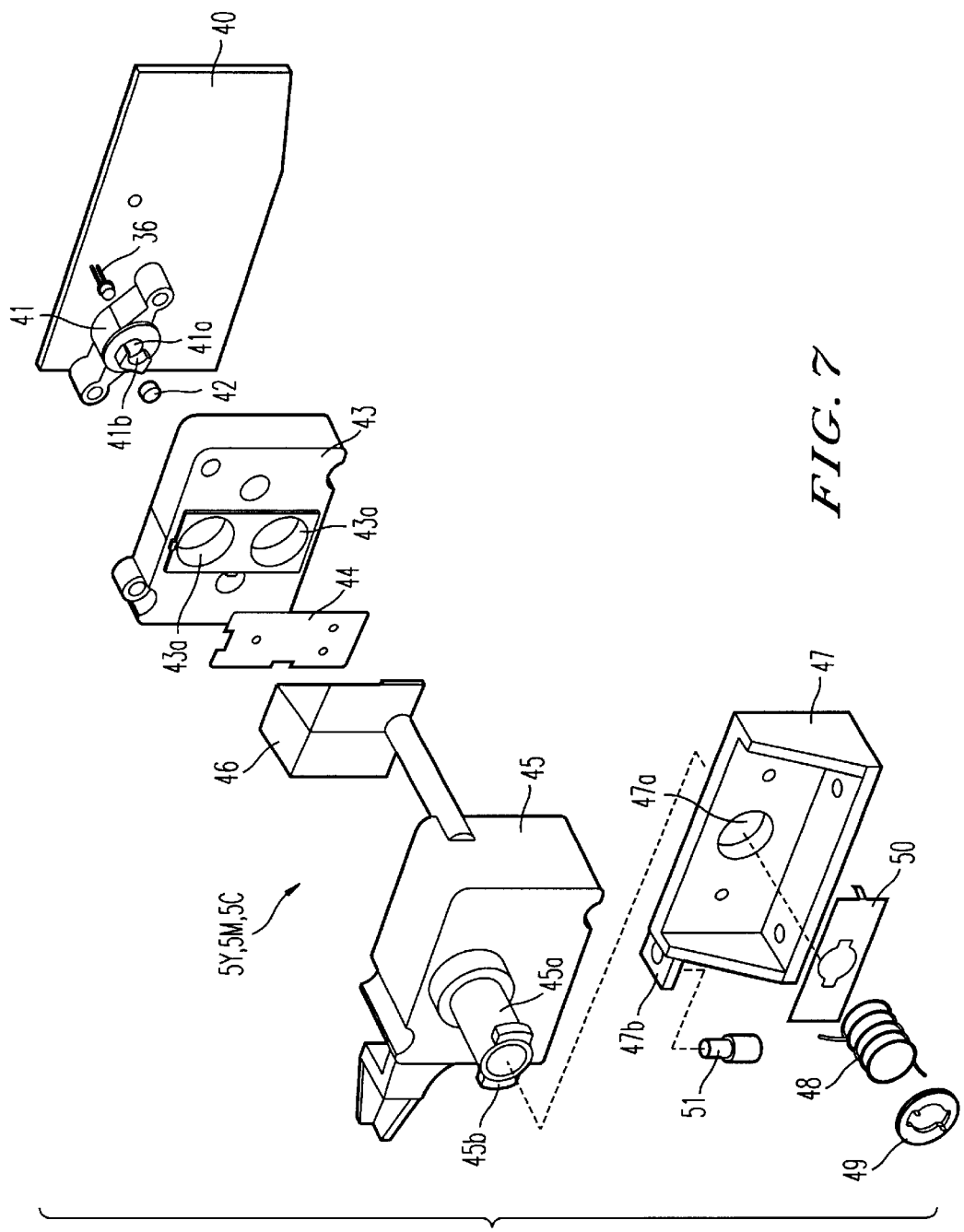

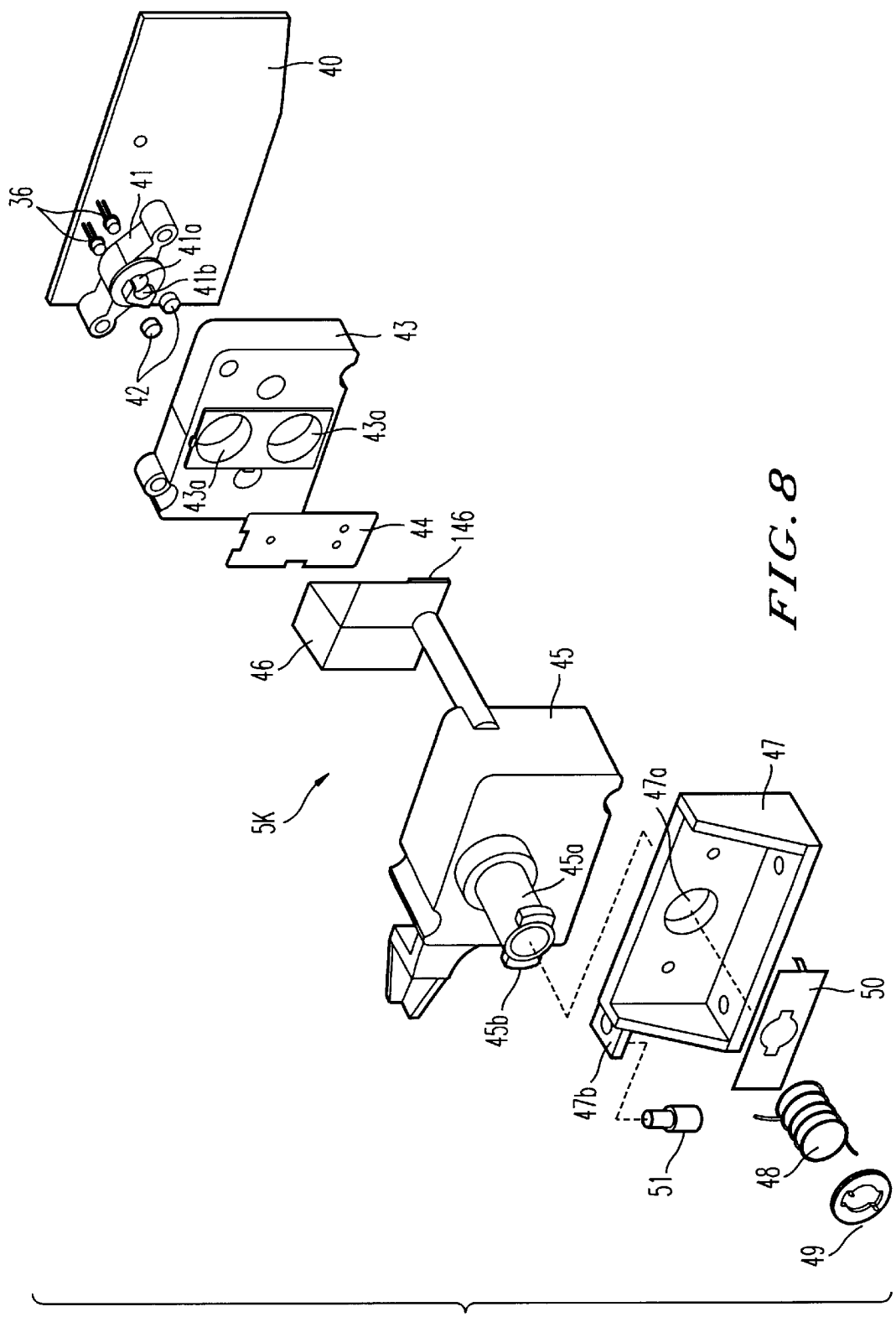

IMAGE FORMING APPARATUS AND METHOD FOR CHANGEABLE IMAGE FORMING MODES BETWEEN A SINGLE COLOR MODE AND A MULTIPLE COLOR MODE

BACKGROUND OF THE INVENTION

1. Field of the Invention

This invention relates to an image forming apparatus and method for changeable image forming modes between single color mode and a multiplicity of color modes, more particularly, this invention is concerned with a color image forming apparatus and method selectively operable in a multiple color image forming mode using two, three or four colors or in a single color image forming mode.

2. Discussion of the Background

In general, a number color image forming apparatuses, e.g. full color copy machines, full color printers, have selectable image forming modes which are a multiple color mode and a single color mode. This type of apparatuses can selectably output full color images or single color images like a monochrome images by only one machine.

For further user needs, the image forming apparatus are required to have both a high quantity of output images in full color images and a high output speed in single color image. Referring to FIG. 1 of the drawings, there is shown a specific construction of single color images forming apparatus of the type electrostatically forming a latent image on a photoconductive drum by controlling a laser in response to image signals.

As shown, a scanning section 200 includes a color CCD (Charge Coupled Device) image sensor 201 for reading an image of a document 100 and producing corresponding electric signals (i.e. image data). An image processing section 400 performs optimal image processing with the electric signal and converts the processed signals to color image signals representative of an image to record.

A writing section 300 receives the color image signals from the image processing section 400 to reproduce the document image on a photoconductive drum 5. Various conventional units for effecting electrophotography are arranged around the drum 5. Specifically, a main charger 510 uniformly charges the surface of the drum 5. The writing section 300 has a laser diode, which emits a laser beam. The laser beam is modulated by particular color image signals and scans the charged surface of the drum 5. As a result, a latent image representative of the document image is formed on the drum 5. The laser beam is incident to and deflected by a polygonal mirror 3 being rotated by a scanner motor 1. The laser beam from the mirror 3 is focused in the form of a spot on the drum 5 by conventional f-theta lenses 4.

A developing section 500 develops the latent image by a toner to produce a corresponding toner image. The developing section 500 has a yellow (Y) developing unit 500Y, a magenta (M) developing unit 500M, a cyan (C) developing unit 500C, and a black (Bk) developing unit 500Bk. For details of the developing section 500, reference may be made to, for example, U.S. Pat. No. 4,928,144, the disclosure of which is herein incorporated by reference. A cleaning section 520 removes the toner remaining on the drum 5 after the transfer of the toner image which will be described.

On the other hand, a sheet feed section 600 is loaded with a stack of sheets 601. A pick-up roller 602 feeds the sheets 601 one by one toward an image transfer section 700 via a transport roller 604 and a register roller 603. The image transfer section 700 is available in various forms as taught in, for example, U.S. Pat. Nos. 4,835,582, 4,862,214, 4,864,358 and 4,872,037 the disclosure of which is also incorporated by reference. While a transfer drum 701 drives the sheet 601, a transfer charger 702 transfers the toner image from the drum 5 to the sheet 601. To produce a black-and-white copy, a black toner image is formed on the drum 5 by the black developing unit 500Bk and then transferred to the sheet 601. Hence, the formation of a latent image, development of the latent image and transfer of the resulting toner image are each effected only once.

In the event of full color copying (i.e. printing), such a sequence of image forming steps are repeated with each of Y, M and C, i.e., three times in total or with each of Y, M, C and Bk, i.e., four times in total. The sheet 601 carrying the toner image thereon is separated from the transfer drum 701 at a sheet separating section 703 and then transported to a fixing section 800 to have the toner image fixed thereon. Finally, the sheet or copy 701 is driven out of the apparatus.

However, this type of a color image forming apparatuses carry out the above same sequence Y, M, C, Bk, four times in total in a full color image forming. Therefore, the image forming apparatus scarify the throughput to form full color images.

There is another known type of color image forming apparatuses. This type of color image forming apparatus employs an intermediate transfer belt or a sheet transfer belt where each developing unit Y, M, C, Bk are arranged in tandem.

Referring to FIG. 2 illustrates an example of this type of image forming apparatuses. An image transfer unit of this image forming apparatus has four photoconductive drums 1A, 2A, 3A and 4A on which color data of an image to be recorded with respect to yellow, magenta, cyan and black are optically written to form a latent image of a respective different color thereon and developing devices 1B, 2B, 3B and 4B each arranged in connection with each of the four photoconductive drums, respectively. The original color is separated to three colors, i.e., blue, green and red each of which is detected by a respective optical sensor. An image processor calculates color data of yellow, magenta, cyan and black on the basis of the luminous intensity of each of the separated three colors. The electrostatic latent images formed on each of the photoconductive drums 1A, 2A, 3A and 4A are developed by a toner of a corresponding color contained in the respective corresponding developing devices. A sheet is fed onto a transfer belt 5 from a paper container through a resist roller unit 7 and is conveyed by the transfer belt 5 which circulates along the photoconductive drums and comes in contact therewith one after another. The sheet is electrostatically charged and secured to the conveyor belt surface. The visible toner image formed on each of the photoconductive drums 1A, 2A, 3A and 4A are transferred to the sheet by a function of a corresponding transfer charger 1C, 2C, 3C or 4C disposed behind the transfer belt 5 at the position of each photoconductive drum in such a manner that the different color toner images are superposed one above the other to form an image of multi-colors on the record sheet. The full color image is subsequently fixed on the sheet by a fixing roller unit 8.

The color image forming apparatus illustrated in FIG. 2 has an image reading unit 9 disposed on the apparatus body. The color of an original (not shown) to be copied is optically separated to the above mentioned three colors and read by three CCDs 10, respectively, arranged in the image reading unit 9. An image processor device (not shown) calculates image color data for each color on the basis of the output signal from each of the three CCDs 10. A laser beam source is disposed for each of the photoconductive drums 1A, 2A, 3A and 4A. Each laser beam source is driven to turn on and off in accordance with the calculated image color data to optically write the image of each separated color on the photoconductive drum.

This type of the image forming apparatus has also another problem such as the fact that an image forming speed is not improved on the single color mode and the multiple color mode. Because the sheet is transferred to on the transfer belt by same speed and same timing between the single color mode and multiple color mode.

For the above problem, a solution is described in Japanese Laid Open Patent Application 04-284,468. The solution is to accelerate a rotation speed of the polygon mirror or a clock speed in order to increase speed of the mono color printing in comparison with one of the full color printing.

However, the rotation speed of the polygon mirror or a clock speed is preliminary set at a maximum selling in order to obtain a full use of its potential performance. It is hard to further increase rotational speed and a clock when the single color mode is selected. Therefore, additional improvement is difficult using the same structure.

Referring to FIG. 3, an image forming apparatus in which an image forming speed is increased without increasing a scanning speed at the time of a subtractive multiple color mode is described.

At the time of a single color mode like a monochromatic printing mode K, movable mirrors MMa, MMc, MMd are arranged at an optical path changeover position and a turnable mirror RM 1 is arranged at the optical path changeover position so that four light beams La–Ld emitted from laser diodes 31*a*–31*d* and deflected by a polygonal mirror 33 are all led to a photoreceptive drum 21K. Then, a sheet is supplied at the system speed of four times of a default speed. The four light beams La–Ld modulated by the image data of the (4n–3)th, (4n–2)th, (4n–1)th and 4nth scanning lines of the K are emitted in parallel in coincidence with the supply of the recording sheet.

However, the present inventor identified that the above apparatus has the following four problems. First, the apparatus needs mechanical moving parts by which the position of optical devices (e.g. mirror) are adjusted in the optical path upon the switching the multiple color mode and the single color mode. The switching of the photoconductive drum, which the light beam scanned and adjustment of the optical path are accomplished by the above.

Secondly, an already existing image forming apparatus can not employ this system. If the existing image forming apparatus employs this system, significant redesigns are required. Complex and precise mechanical moving parts are then needed in order to carry out the above adjustment.

A third problem is that the apparatus generates a plurality of light beams by the multiple optical scanning system for originally other color image forming. Each incident angle of the light beams to the photoconductive drum is dynamically changed and each beam spots on the photoconductive drums are distorted. Therefore, the apparatus declines in the quality of the image. Furthermore, shading characteristics are of worse quality.

The fourth problem is that when the print sequence carry out in ascending order by single color print, then a full color print, and a single color print, the apparatus has to precisely move mechanical moving parts such as mirror in the optical system each time. This adjustment of the optical device requires a predetermined time interval. The total performance of the prior apparatus decreases. The image data also send other light source changed from original light source each printing.

SUMMARY OF THE INVENTION

To solve the above and other problems, according to one aspect of the present invention, an optical system for an image forming apparatus has a first light source for selectably emitting the number of image forming light beams based upon control signals and a second light source for emitting image forming light beams less than one of said first light source.

According to a second aspect of the present invention, the first light source of this optical system selectively emits multiple light beams and a single beam or selectably emits two beams and a single beam.

According to a third aspect of the present invention, an image forming apparatus has an optical system in which a first light source is selectably emitting the number of image forming light beams based upon control signals and a second light source is emitting the number of image forming light beams less than one of the first light source, photoconductive devices for forming an electrostatic latent image by the optical system, developing devices each arranged in connection with each of the photoconductive devices are supplying a developer to each of the photoconductive devices to develop latent images thereon, and a movable sheet transfer belt contacting with photoconductive members, wherein the developed images may be transferred to an image forming medium.

According to a fourth aspect of the present invention, an image forming apparatus, has an optical system in which a first light source is selectably emitting the number of image forming light beams based upon control signals and a second light source is emitting the number of image forming light beams less than one of the first light source, photoconductive devices for forming an electrostatic latent image by the optical system, developing devices each arranged in connection with each of the photoconductive devices are supplying a developer to each of said photoconductive devices to develop latent images thereon, a movable intermediate transfer belt contacting with the photoconductive members, wherein the developed images may be transferred to the transfer belt and a transfer member for contacting with a sheet, wherein the intermediate transferred images may be transferred to an image forming medium.

BRIEF DESCRIPTION OF THE DRAWINGS

Other aspects and further features of the present invention will become apparent from the following detailed description when read in conjunction with the accompanying drawings, wherein:

FIG. 7 is a perspective view of the light source for yellow, magenta and cyan according to the present invention;

FIG. 8 is a perspective view of the light source for black, which has two laser diodes according to the present invention;

DESCRIPTION OF THE PREFERRED EMBODIMENT

Figure 1:
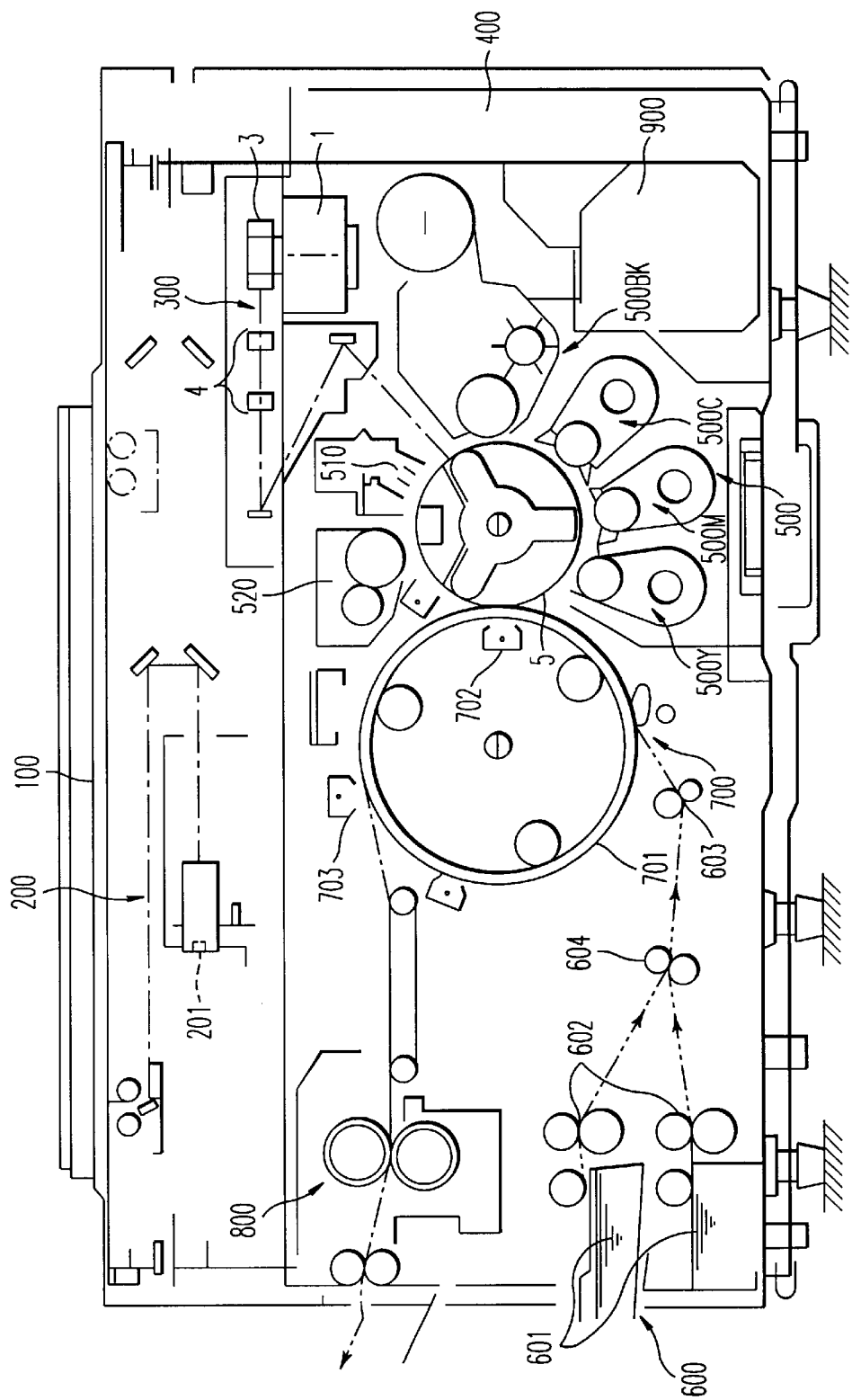
FIG. 1 is a cross-sectional view of the conventional image forming apparatus which developing devices are arranged around a photoconductive drum according to the prior art.
Figure 2:
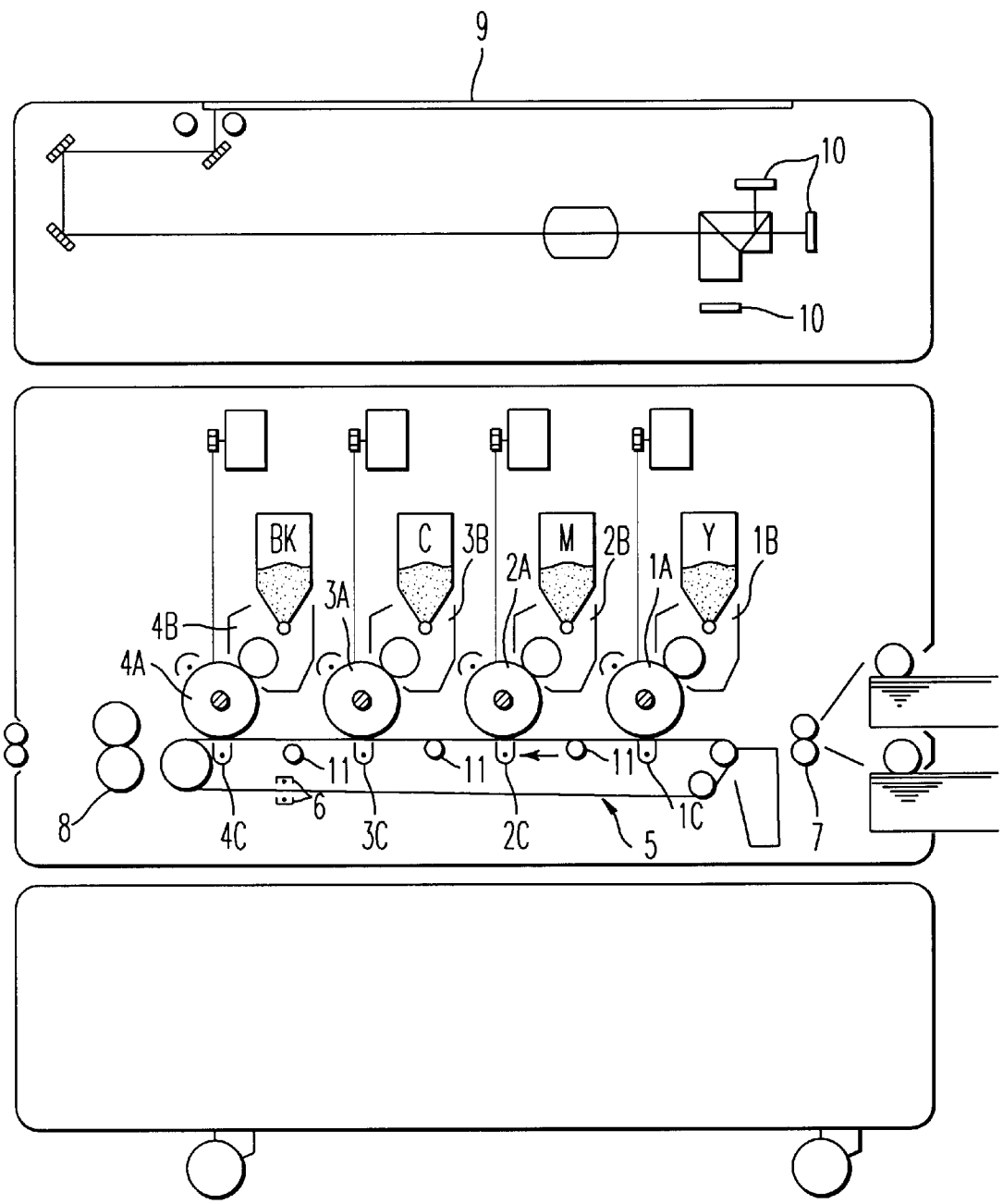
FIG. 2 is a cross-sectional view of the conventional image forming apparatus wherein an optical unit, a photoconductive drum and developing device are arranged in sets along a transfer belt according to the prior art.
Figure 3:
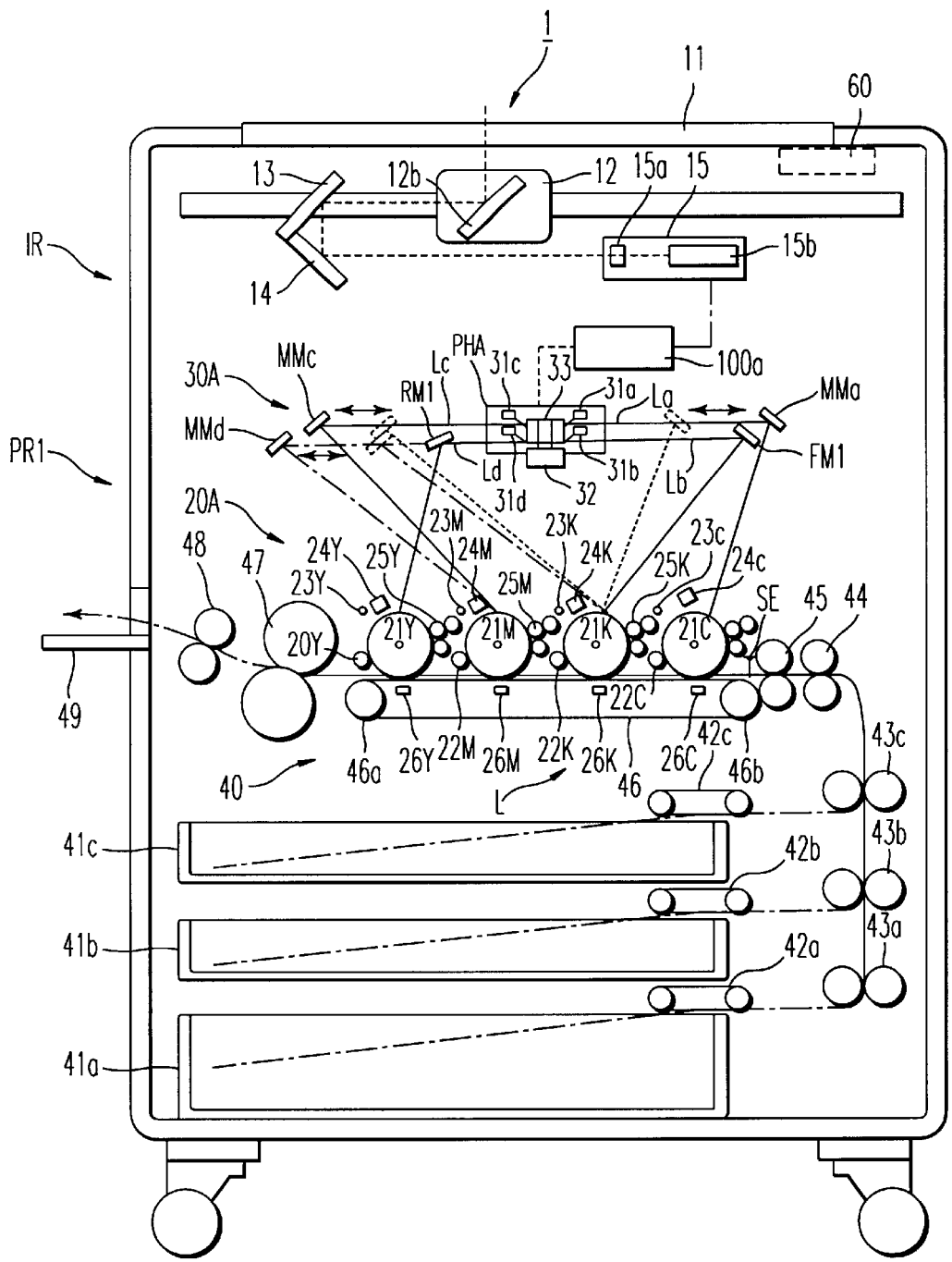
FIG. 3 is a cross-sectional view of an image forming apparatus which movable mirrors are arranged at an optical path changeover position according to the prior art.

A description will now be provided of preferred embodiments according to the present invention. Referring now to the drawings, wherein like reference numerals designate corresponding structure throughout the views.

Figure 4:
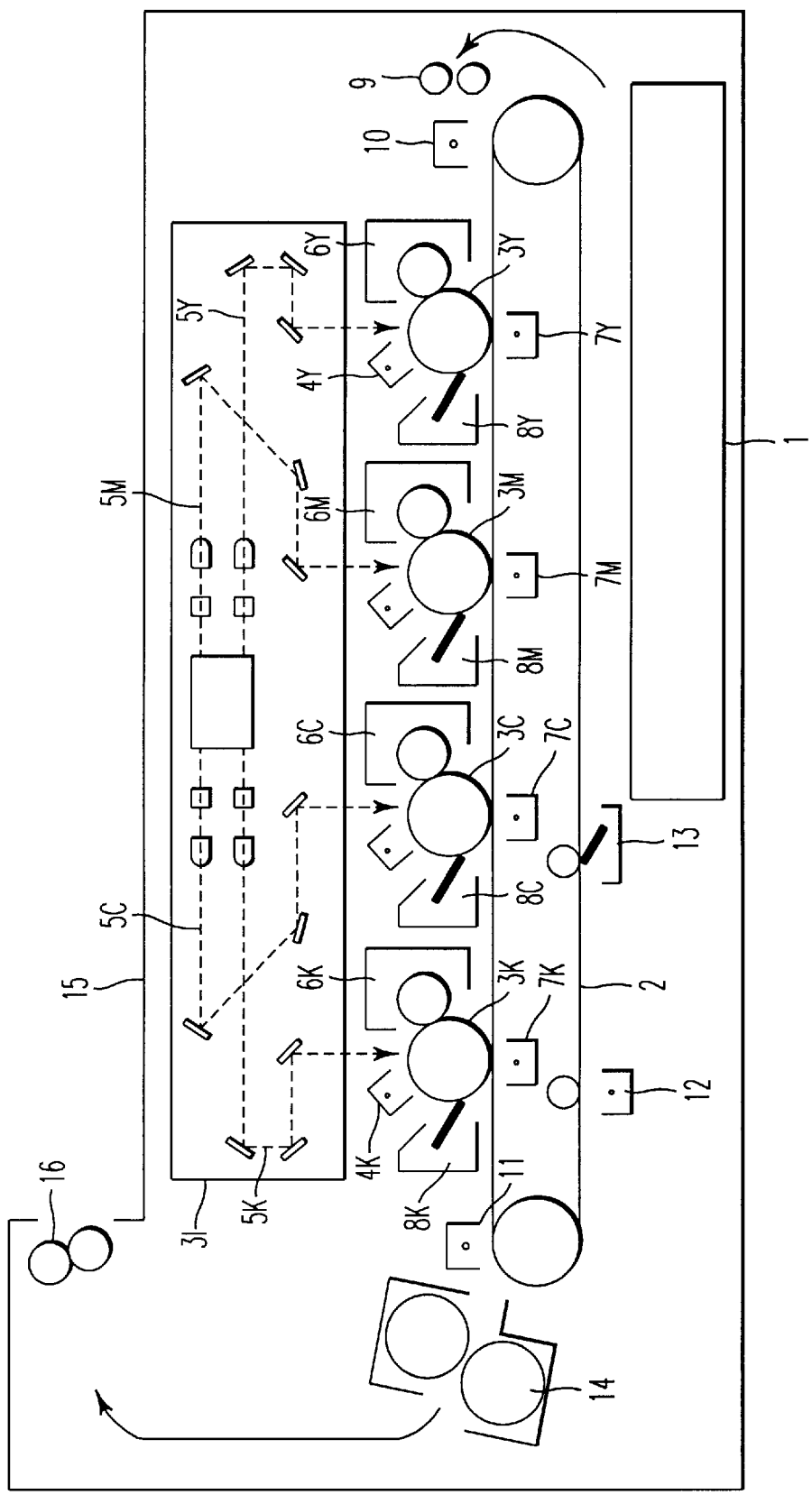
FIG. 4 is a cross-sectional view of an image forming apparatus according to a first embodiment of the present invention.

With reference to FIG. 4, one preferred embodiment of the changeable image forming mode between a single color mode and a multiple color mode. The apparatus 15 includes an optical scanning system 31, four image forming unit corresponding to each toner, yellow, magenta, cyan and black, a transfer belt 2, a paper container 1 and a fixing device 14.

The image forming unit for yellow has a photoconductive drum 3Y on which color data of an image to be recorded with yellow toner is optically written to form a latent image thereon. A charger 4Y, a cleaner 8Y with a cleaning blade and a developing device 6Y are arranged around the photoconductive drum 3Y. The other image forming unit for magenta, cyan and black are also the same structure each other.

The electrostatic latent images formed on each of the photoconductive drums 3Y, 3M, 3C and 3K are developed by a toner of a corresponding color contained in the respective corresponding developing device 6Y, 6M, 6C and 6K respectively. A record paper is fed onto the transfer belt 2 from the paper container 1 through a pair of resist rollers 9 and conveyed by the transfer belt 2 which circulates along the photoconductive drums and comes in contact therewith one after another. The record paper is electrostatically charged and secured to the conveyor belt surface. The visible toner image formed on each of the photoconductive drums 3Y, 3M, 3C and 3K are transferred to the record paper by a corresponding transfer charger 7Y, 7M, 7C and 7K disposed behind the transfer belt 2 at the position of each photoconductive drum in such a manner that the different color toner images are superposed one above the other to form an image of multi-colors on the record paper. After that, the multiple color image is fixed on the paper by the fixing roller 14.

Figure 5:
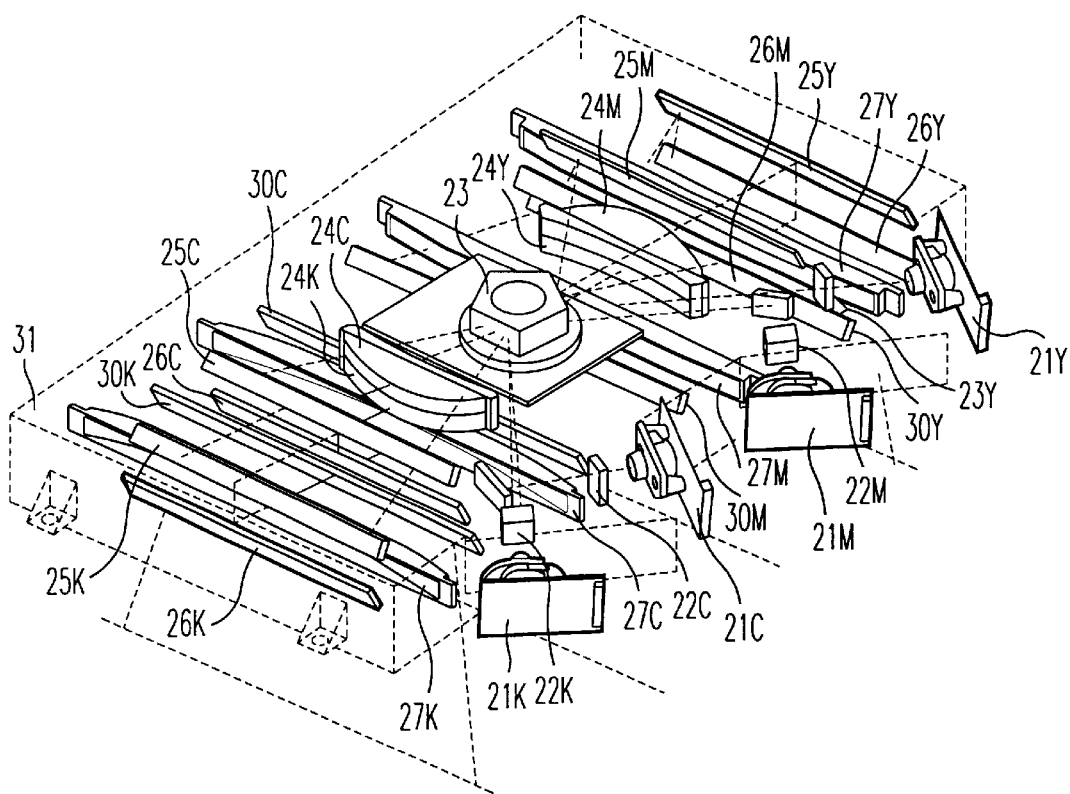
FIG. 5 is a perspective view of an optical system according to the first embodiment.
Figure 6A:
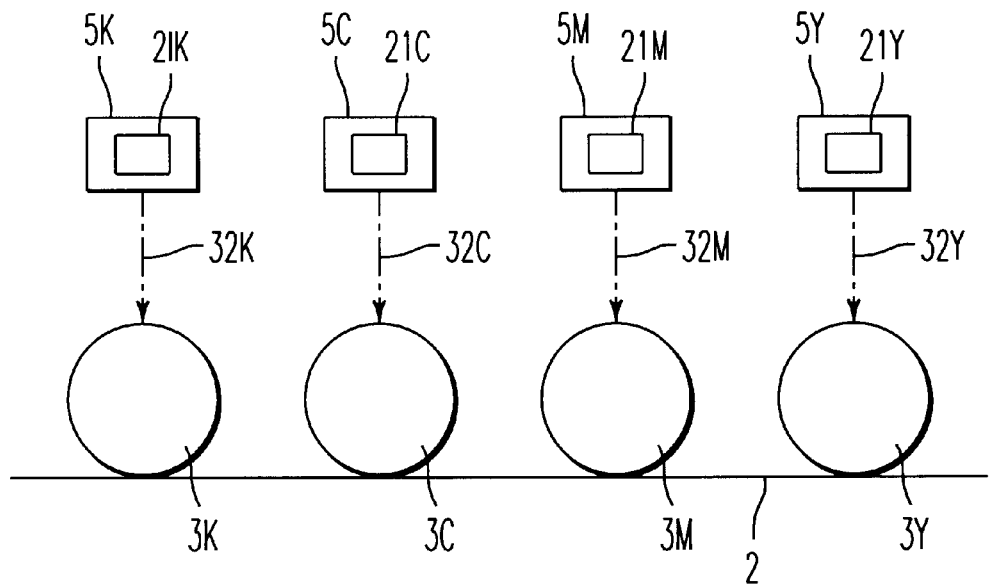
FIG. 6 is a conceptual view of a mechanism in the image forming apparatus changeable image forming mode between a single color mode and a multiple color mode.
Figure 6B:
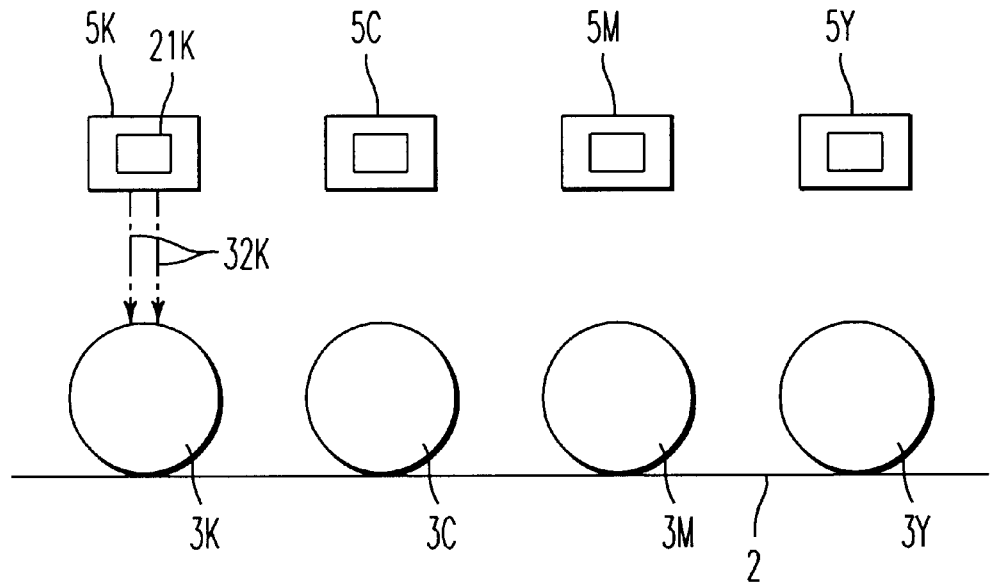

Now referring to FIG. 5, the optical scanning system 31 includes a set of light sources 21Y, 21M, 21C and 21K, and each light source emits an image forming light beam towards a common polygon mirror 23 via each collimator lens 22Y, 22M, 22C and 22K respectively.

Each of the light beams from the light source 21C and 21K is reflected and scanned by a reflecting surface of the polygonal mirror 23. The reflected beams are focused by a series of lenses 22C, 22K, 24C, 24K, 27C and 27K, and the focused images are then redirected downwardly by a series of mirrors 25C, 26C, 30C, 25K, 26K, 30K for scanning the focused images in predetermined directions on a respective temporary image-forming surface.

Similarly, the reflected light beams from the light source 21Y and 21M are focused by a series of lenses 22Y, 22M, 24Y, 24M, 27Y, 27M, and the focused images are then redirected downwardly by a series of mirrors 25Y, 26Y, 30Y, 25M, 26M, 30M for scanning the focused images in predetermined directions on a respective temporary image forming surface. As a result, the desired image is initially formed beyond or further away from the lenses and the polygon mirror.

Now referring to FIGS. 6–9, this is a conceptual view of the present invention. The light sources 21Y, 21M and 21C have one laser diode and each the light sources 21Y, 21M and 21C emit single beam respectively. The light source 21K has two laser diodes that the number of emitted light beams is selectably capable of changing.

When the full color mode is selected, the number of the light beams set one in the light source 21K with the detail mechanism of changing the number of the light beams described later. All light sources emit a single beam and scan the photoconductive drums.

On the other hand, when the single mode is selected, the image data are not sent to drivers of the light sources 21Y, 21M and 21C, and the light sources 21Y, 21M and 21C does not emit any light beams. Furthermore, the driver of the light source 21K activates both laser diodes of the light source 21K, the two laser diodes emit the light beams corresponding to the image data of two lines.

In the above embodiment of the apparatus in the present invention, mechanical movements, a change of the rotation speed of the polygon mirror and an inclination of the clock frequency do not need to be changed although the image forming speed is capable of changing between the single color mode and the full color mode. Each laser diode of light sources 21Y, 21M and 21C, even the each laser diode of the light source 21Bk for the black toner, emit a single light beam corresponding to the image data of one line.

With reference to FIG. 7, the detailed structure of the light source employing one laser diode is shown, which is an exploded perspective view showing the construction of optical elements of the single beam scanning unit. As shown in FIG. 7, the laser diode 36 is fixed on the supporters 41, and assembled with the rear surface of the base body 40 with screws so as to coincide with the optical axis of collimator lens 42. The collimator lens 42 is accommodated in and tightly engages with a hole 41a and of the base body 40 performing the positional adjustment respectively with the laser diode 36, and bonded to the hole 41a by a binding agent, etc. The collimator lens 42 converts the respective light fluxes from the laser diode 36 to parallel light fluxes. The light rays emitted from the collimator lens 42 is form-shaped by respective circular slits of the iris plate 44 for the light ray and composed by a beam composing medium 46. Moreover, although the iris plate 44 is provided separately in the present embodiment, the engaging hole 43a engaging the collimator lens 42 can be commonly used as the iris plate.

With reference to FIG. 8, the detailed structure of the multiple beam scanning apparatus construction employing two laser diodes is shown, which includes an exploded perspective view showing the construction of optical elements of the multiple beam scanning apparatus of the present invention. As shown in FIG. 8, the laser diodes 36 are respectively fixed on the supporter 41, and assembled with the rear surface of the base body 40 with the screws so as to coincide with the optical axis of collimator lenses 42. The collimator lenses 42 are accommodated in and engaged with tightly engaging holes 41a and 41b of the base body 41 performing the positional adjustment respectively with the laser diodes 36, and bonded to the holes 41a, 41b by binding agent, etc. The collimator lenses 42 convert the respective light fluxes from the laser diodes 36 to parallel light fluxes. The light rays emitted from the collimator lenses 42 are form-shaped by respective circular slits of the iris plate 44 for the respective light rays and composed by a beam composing medium 46. Moreover, although the iris plate 44 is also provided separately in the present embodiment, the engaging holes 41a and 41b engaging the collimator lenses 42 can be commonly used as the iris plate 44.

Figure 9:
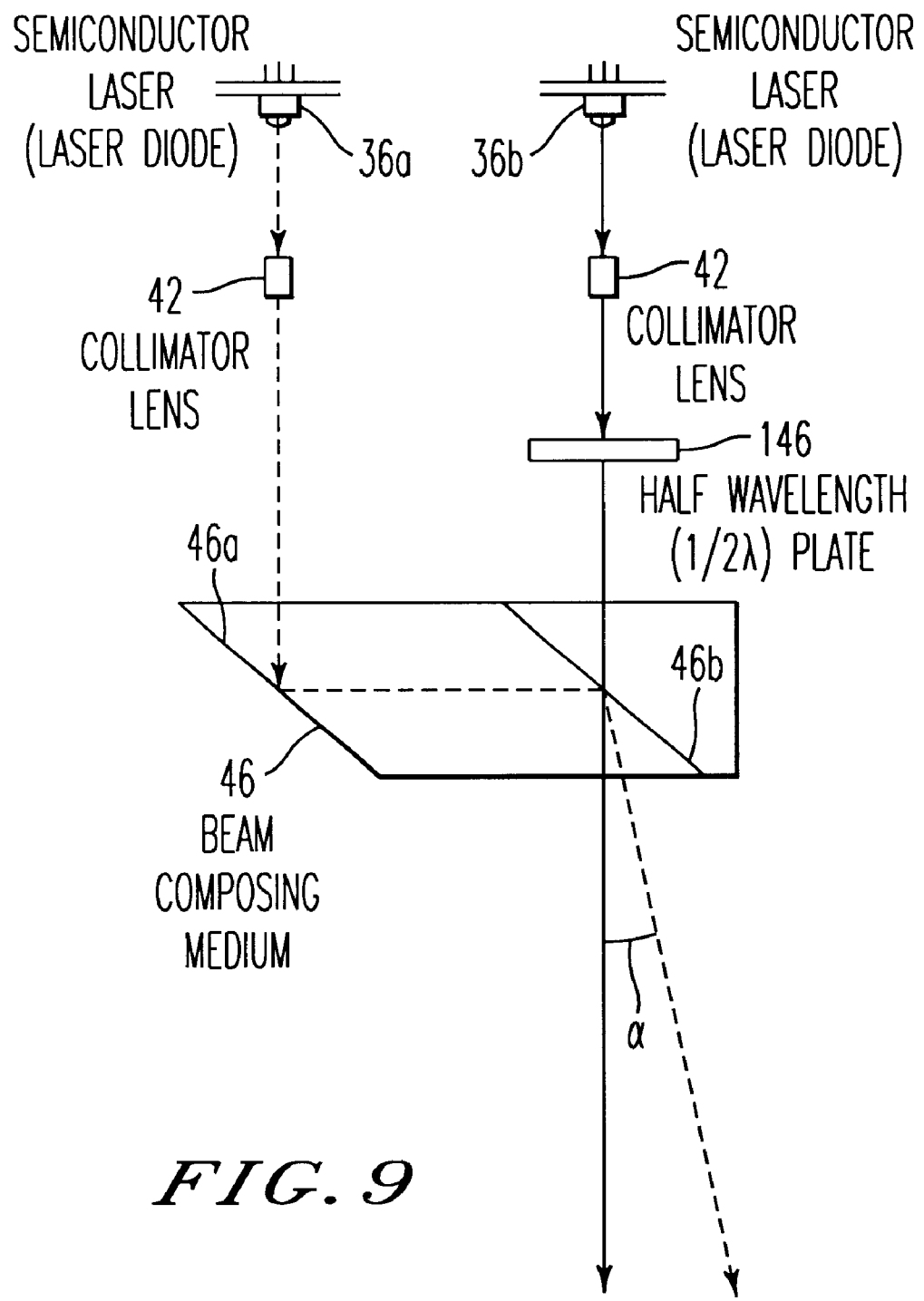
FIG. 9 is a cross-sectional view of a beam composing medium in which located the light source for black.

Next, the beam composing medium 46 is described referring to FIGS. 8 and 9. The laser diodes 36 are arranged on a common plane with the p-n junction surfaces thereof abutting each other. The polarization of either one of the beams is rotated by 90 degree by half wavelength plate 146 mounted on the incident surface of the beam composing medium 46, and the beam passes through on the polarized beam splitter surface 46b of the beam composing medium 46. Furthermore, the beam of the laser diode 36a is internally reflected on the slanted surface 46a of the beam composing medium 46 and further reflected on the polarized beam splitter surface 46b of the beam composing medium 46. The reflected beam is composed with the beam of the laser diode 36b near the optical axis of the laser diode 36b serving as the standard. Optical axes relating to the respective laser diodes 36a and 36b are set so as to be inclined with respect to each other by the angle. α, as shown at the output side of the beam composing medium 46, i.e., slightly deviated from each other by the small angle α in the main scanning direction. The angle α is obtained, for example, by displacing the laser diode 36a in relation to the collimator lens 42 to produce an eccentricity in the emitted beam from the collimator 42. The beams emerging from the beam composing medium 46 are in parallel.

The beam composing medium 46 and the iris plate 44 are supported at a predetermined position on the rear surface of the flange member 45 and fixed on the base body 43 with screws. The respective members in the optical path from the laser diodes 36a and 36b to the flange member 45 are unitarily fixed on the substrate 40 on which the driving circuits of the laser diodes 36a and 36b are provided, and those members serve as a light source unit.

Figure 10:
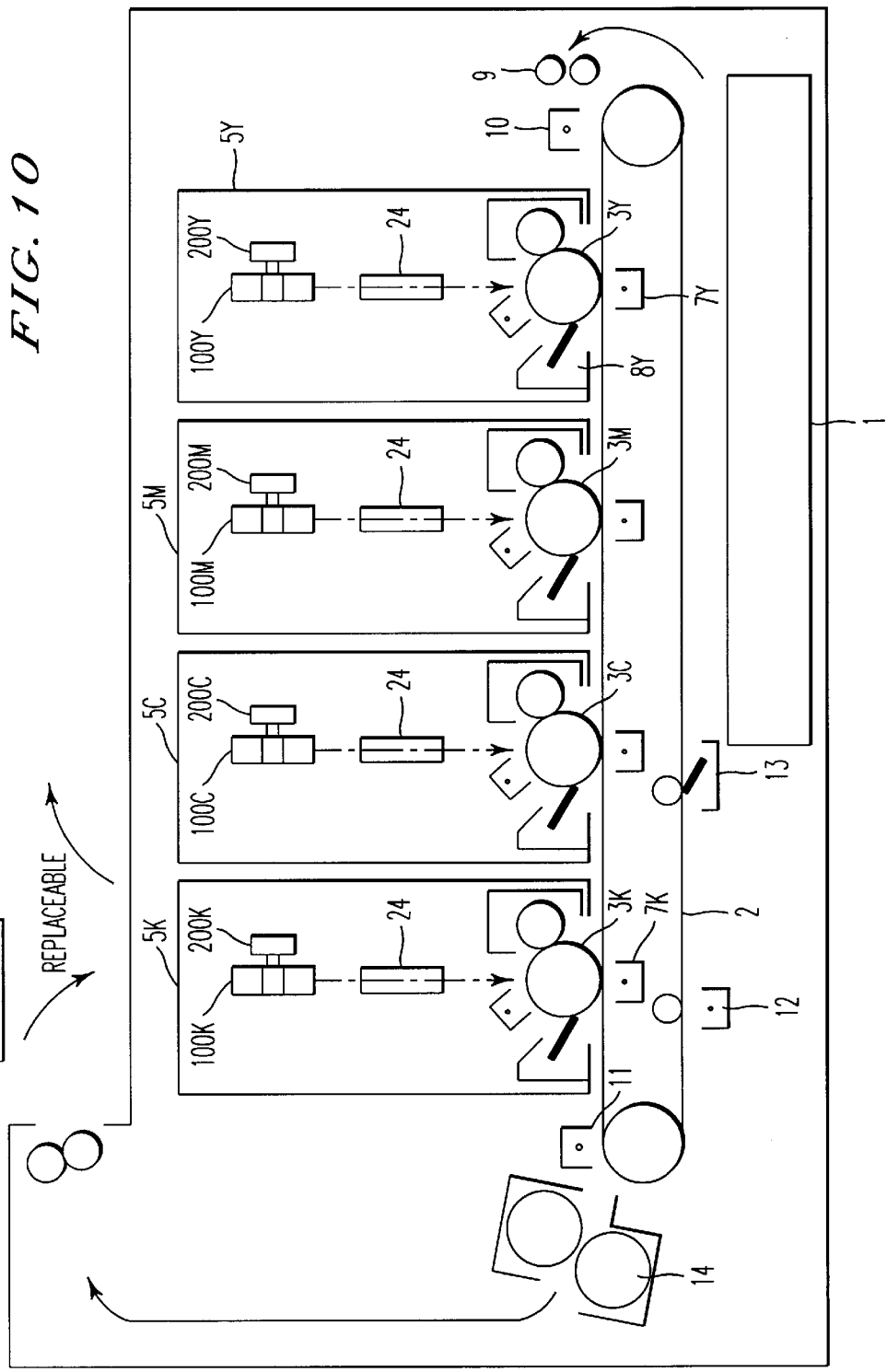
FIG. 10 is a cross-sectional view of an image forming apparatus according to a second embodiment of the present invention.
Figure 11:
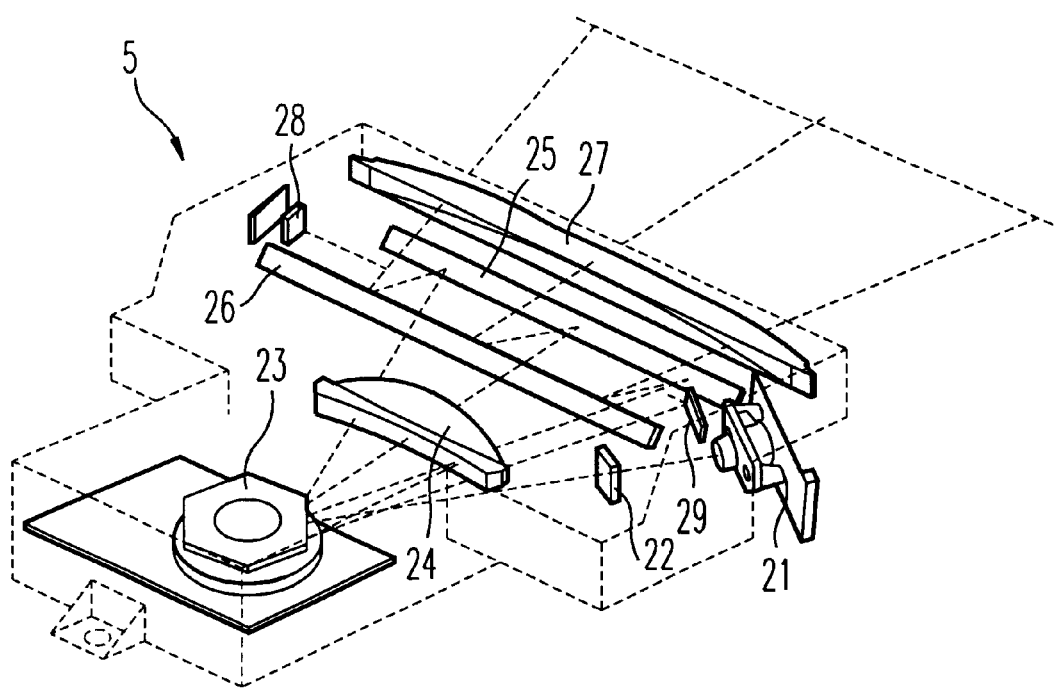
FIG. 11 is a perspective view of another embodiment of an optical scanning unit.

Referring to FIGS. 10 and 11, a second embodiment of the image forming apparatus according to the present invention is illustrated as a cross-sectional view in FIG. 10. The optical unit thereof is described below but detailed explanations of the image forming apparatus concerning the other members are omitted because they are substantially the same as the first embodiment.

The image forming apparatus of the present invention has four sets of an optical scanning units as shown FIG. 11.

As shown FIG. 11, the optical scanning unit 5 is constructed with the respective members arranged in the optical path from the laser diode in the light source 21. The beam emitted from the light source 21 is transmitted to a polarizing medium including a cylinder lens 22 and reflecting a polygon mirror 23. The light beam thus transmitted is repeatedly polarized in the main scanning direction by rotating the above polygon mirror 23. The light beam reflected on the polygon mirror 23 are further projected as light spots on the predetermined scanning/recording surface by use of the scanning lens constructed with a function—theta lens 24.

A photo-sensor 28 employed as a light intensity sensing medium is disposed at a position near the surface to be scanned and detects the intensity of the scanning beam in a margin area. The light sources in the optical scanning unit 5Y, 5M and 5C have only one laser diode and the light source 21K in the optical scanning unit 5 has two laser diodes selectably activated.

Figure 12:
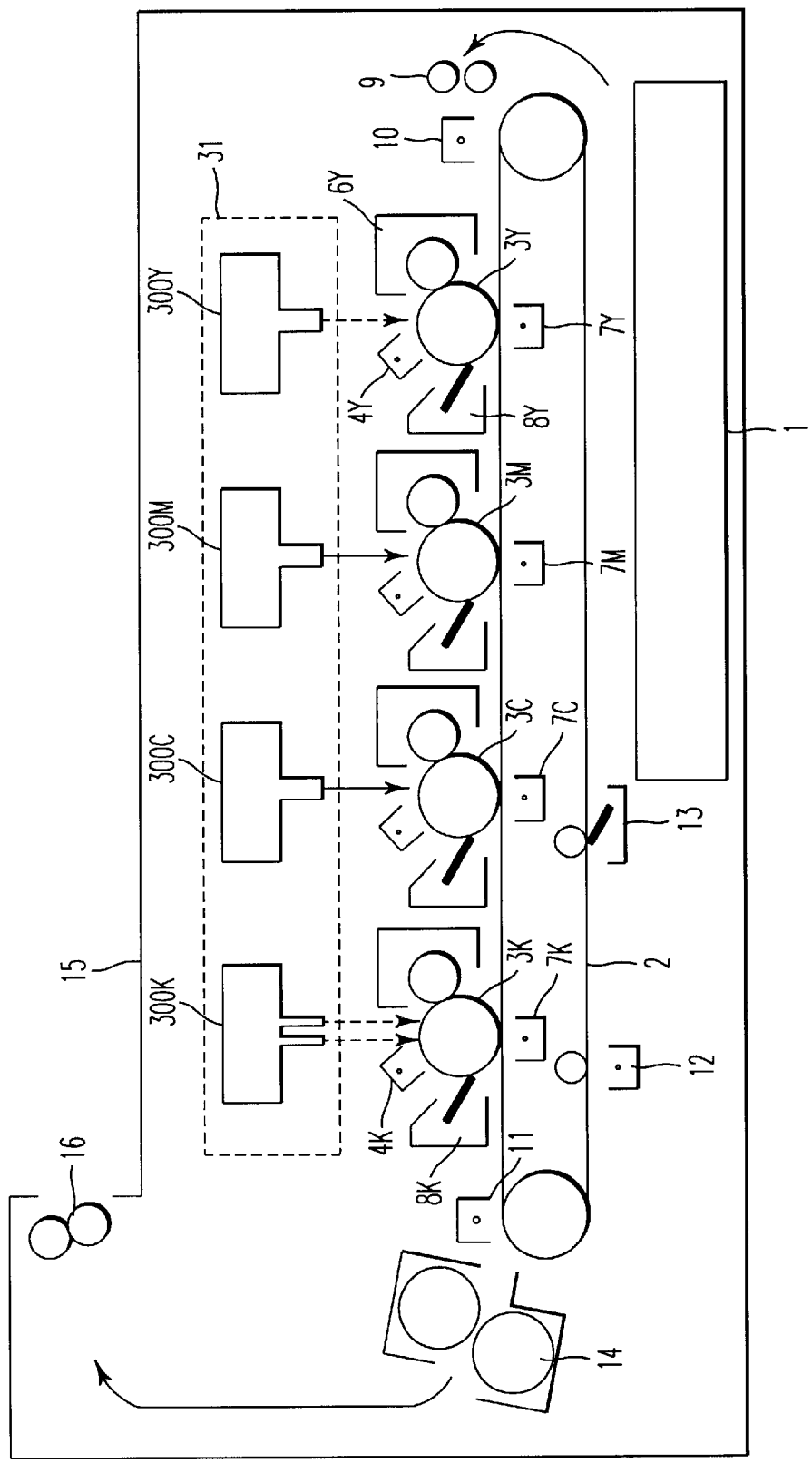
FIG. 12 is a cross-sectional view of an image forming apparatus according to a third embodiment of the present invention.

Now referring to FIG. 12, a third embodiment of the image forming apparatus according to the present invention is illustrated in a cross-sectional view. The optical unit is described below and detailed explanations of the image forming apparatus concerning the other members are omitted because they are substantially the same as the first embodiment and the second embodiment. In the third embodiment, laser diode arrays 300Y, 300M, 300C and 300K are employed as the light sources.

In an optical system 31, the laser diode arrays 300Y, 300M and 300C has a single array of light emitting sources. The laser diode array 300K has double arrays of light emitting sources which can selectably activate the light emitting array of the double arrays. When the single color mode is selected, both arrays of the double arrays in the light source 300K are selected and light sources 300Y, 300M, 300C are not activated. When the full color mode is selected, one of the double arrays in the light source 300K is selected and light sources 300Y, 300M, 300C and the selected array of the light source 300K are activated.

In the above embodiment, the light source for black toner has two laser diodes or two laser diode arrays. However, the present invention is not limited to this embodiment.

In other words, the light source for Black toner has the number of emitting light beams, "M". the light sources for the other color toner have the number of emitting light beams, "N" as following relation as set forth in equation (1):

$$M>N \qquad (1)$$

As a result, when the single color mode is selected, the number of light beams or the number of lines of the laser diode arrays increase more than one color mode.

Therefore, when the light source for black can selectably emit between M light beams and N light beams or between M lines of laser diode arrays and N lines of laser diode arrays and the other light source for yellow, magenta and cyan emit N light beams or N lines of laser diode arrays, the image forming speed of the single color mode become M/N times comparison with one of color mode. For example, the image forming apparatus of the present invention is capable of selecting 12 PPM (print per minutes) under a multiple color mode or 24 PPM at the single color mode. Otherwise the recording pitch of sub scanning direction of the single color mode become M/N times comparison with one of the multiple color mode when the transfer speed of the paper or rotation speed of the photoconductive drum is held at same as the monochrome mode. For example, the image forming apparatus of the present invention is also capable of selecting 600 dpi at the multiple color mode or 1200 dpi at the single color mode.

The number of the light beams from the light source for black or the number of the lines of laser diode arrays can increase so as to be more than one of the other light sources for yellow, magenta and cyan without any mechanical movement. In greater detail, when the mode change the multiple color mode to the single color mode, mechanical movement or electrically change does not need light sources for yellow, magenta and cyan. When the single color mode is selected from the multiple color mode, the multiple light sources for black are driven based on the image data corresponding to multiple lines.

As a result, no time lag arises and throughput at the changing modes does not decrease even if the image forming sequence become mixed full color printing and monochrome printing. Furthermore, the each light source deal with only one kind of image data, e.g. only yellow, only magenta, only cyan. Therefore, complex a electric circuit or control is not needed.

Referring to FIG. 10, the apparatus is capable of reversibly replacing the image forming unit from the light source emitting multiple beams to the light source emitting single beam. The shape of the optical unit is capable of being the same as one of the other units.

When at least one of the optical units can be replaced with in the apparatus, the optical unit emitting single beam is removed and is replaced with the optical unit emitting multiple beams.

Some existing image forming apparatus employ replaceable optical units. In this case, the existing image forming apparatus becomes the image forming apparatus with a changeable image forming mode between single color mode and multiple color mode when at least one preexisting optical unit replaces the optical unit including a light source which emits multiple light beams, the driver thereof and a buffer memory for temporally storing the image data corresponding to multiple lines therein.

Figure 13:
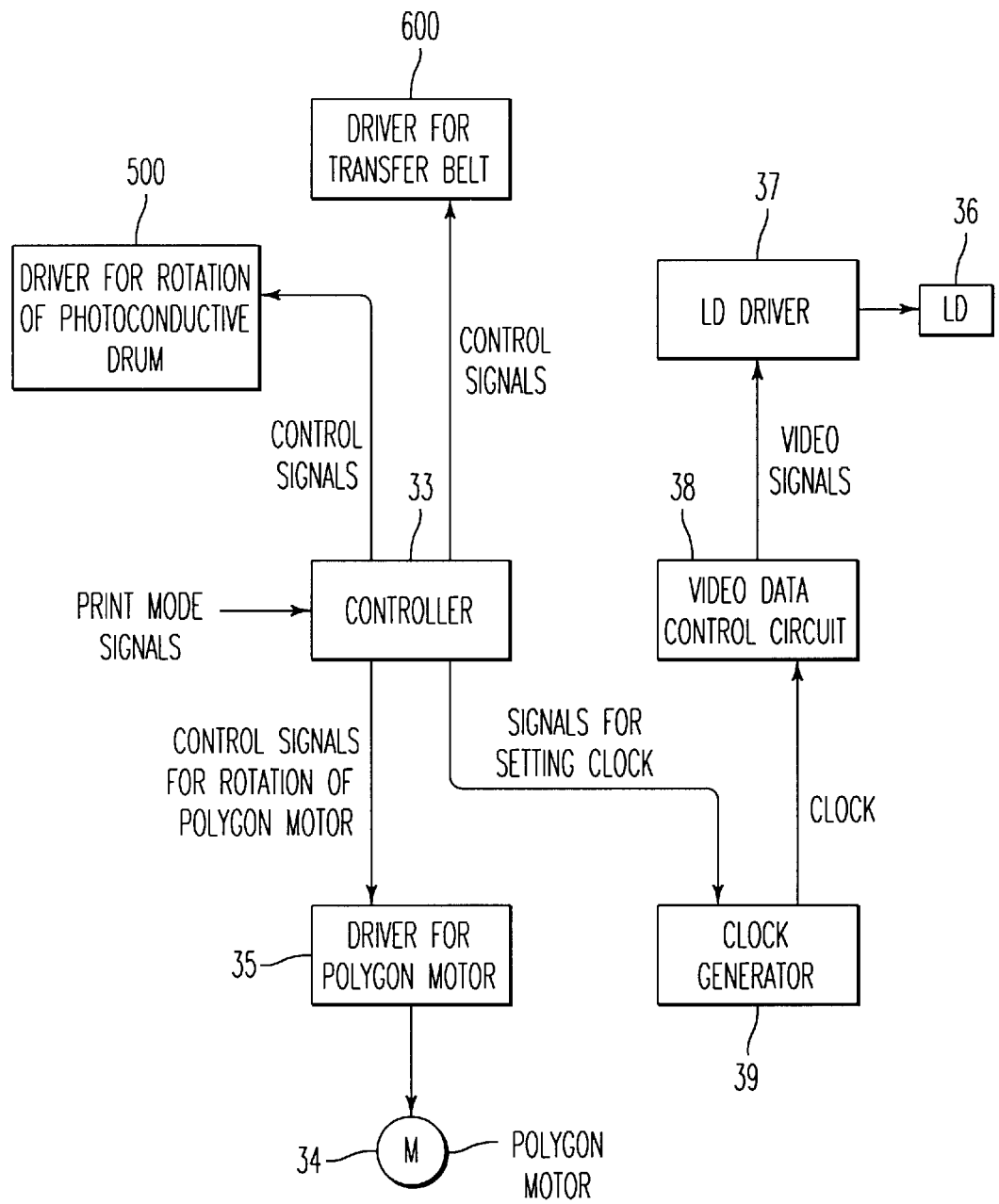
FIG. 13 is a block diagram of the present invention.

Now referring to FIG. 13, a block diagram of the present invention is described. The system includes a controller 33, a driver for polygon motor 35, a polygonal motor 34, a clock generator 39, video data control circuit 38, LD driver 37 and laser diode 36. The controller 33 is a microcomputer and is connected with the driver for polygonal motor 35, the clock generator 39, a driver for transfer belt and a driver for rotation of photoconductive drum. The controller 33 controls rotation of the polygonal motor via the driver for polygonal motor 35 and sends a signal for setting a clock signal of the clock generator 39 and the other drivers based upon inputted print mode signals. The controller 33 controls the rotational speed of the transfer belt or the rotational speed of the photoconductive drum based upon the print mode signals. The video data controller 38 controls the laser diodes 36 via the LD driver 37 based on the clock from the clock generator 39. Finally, the laser diodes 33 or laser diode arrays 33 selected by control of the print mode signal emit a modulated light beam corresponding to the image data based on the video signals.

Figure 14:
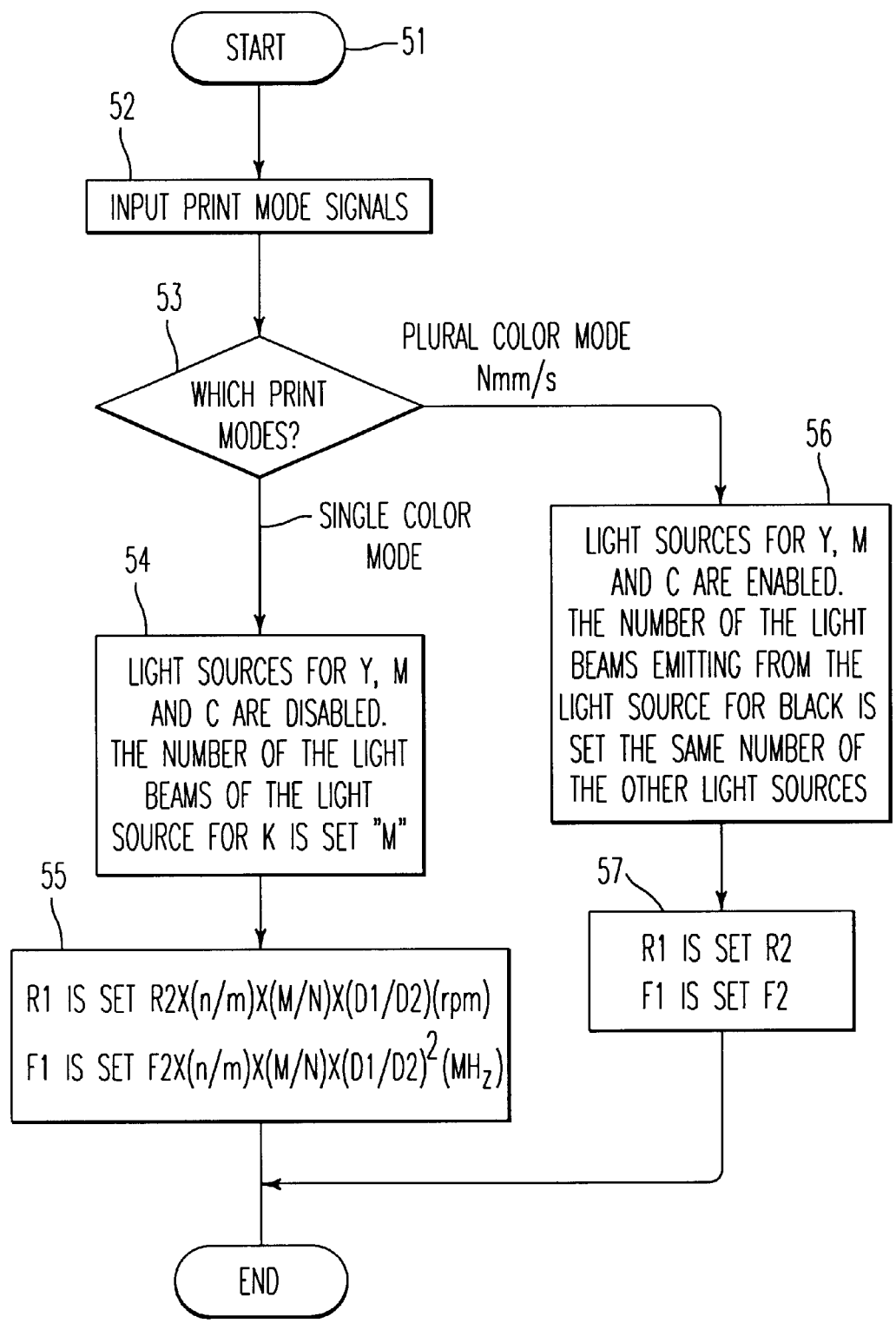
FIG. 14 is a flowchart of changing image forming modes between the single color mode and the multiple color mode.

Now referring to FIG. 14, a flowchart is shown of the change between the single color mode and the multiple color mode of the present invention. When a print sequence start at S1, the process proceeds to step S2. The print mode signal is inputted at step S2. In the next step S3, the print mode is determined based on the print mode signal, e.g. single color or multiple color. In step S3, the print mode is determined based upon an attribute of the image data, e.g. monochrome data.

The process proceeds to step S4 when the print mode is the single color mode. When the print mode is the multiple color mode, the process proceeds to step S6. In step S4, the light sources for yellow, magenta and cyan are disabled and the number of the light beams emitting from the light source for black is set predetermined value M and the rotational speed M (mm/s) of the photoconductive drum is also set for simultaneously writing a plurality of lines. The process next proceeds to step S5. At step S5, the rotational speed R1 of the polygonal motor is set predetermined value as described in the following equations (2) and (3).

$$R1 = R2 \times (n/m) \times (M/N) \times (D1/D2) (\text{rpm}) \qquad (2)$$

$$m > n \geq 1 (m, n: \text{integer}) \qquad (3)$$

R1 (rpm) is the rotational speed of the polygon motor in the single color mode. R2 (rpm) is the rotational speed of the polygonal motor in the multiple color mode. M (mm/s) is the rotational speed of the photoconductive drum in the single color mode. N (mm/s) is the rotational speed of the photoconductive drum in the multiple color mode. D1 (dpi) is the recording density in the single color mode. D2 (dpi) is a recording density in the multiple color mode. It is noted that "n" is a maximum number of the light beams of light sources for yellow, magenta and cyan. It is further noted that "m" is the maximum number of the light beams of the light source for black. Furthermore, at step S5, the clock frequency F1 is set following equation (4).

$$F1 = F2 \times (n/m) \times (M/N) \times (D1/D2)^2 (\text{MHZ}) \qquad (4)$$

wherein F1, F2 is the clock frequency at the single color mode and the multiple color mode, respectively. Under this situation, the speed of the transfer belt (=the rotation speed of the photoconductive drum) of the single color mode is capable of increasing m/n times in comparison with one of the multiple color mode without increasing the rotational speed of the polygonal mirror or the clock frequency.

On the other hand, when the multiple color mode is selected at the step S3, the process proceeds to a step S6. At the step S6, the light sources for yellow, magenta and cyan are enabled and the number of the light beams emitting from the light source for black is set the same number (n) of the other light sources. The rotational speed of the photoconductive drum is also set the same speed N (mm/s) as one of the other light sources.

The process proceeds to a next step S7. The rotation speed of the motor is set the predetermined value R2 (rpm) and the clock frequency F1 is also set the predetermined value F2 (MHZ). Each value is the same as one of the other light sources.

Finally, each light beam corresponding to the print mode are emitted by the light sources and the optical scanning on photoconductive drum are carried out, each electrical latent image forms on the photoconductive drum.

Figure 15:
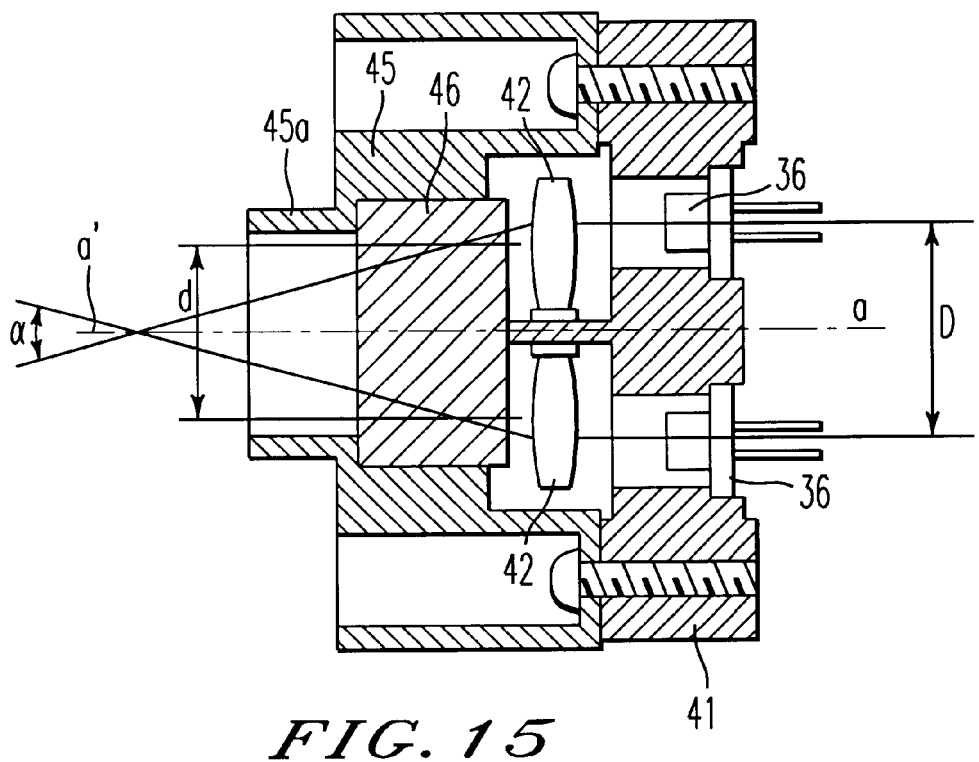
FIG. 15 is a cross-sectional view of an embodiment of the light source for black.

Now referring to FIG. 15 is a cross sectional view showing another assembly of the multiple beam scanning unit.

The laser diodes 36 and the collimator lenses 42 are arranged symmetrically with respect to a optical line a'. A distance D between two laser diodes 36 is wider than a distance d between collimator lenses 42 (i.e. D>d). The light beams emitted from the laser diodes 36 cross each other at angle α.

Figure 16:
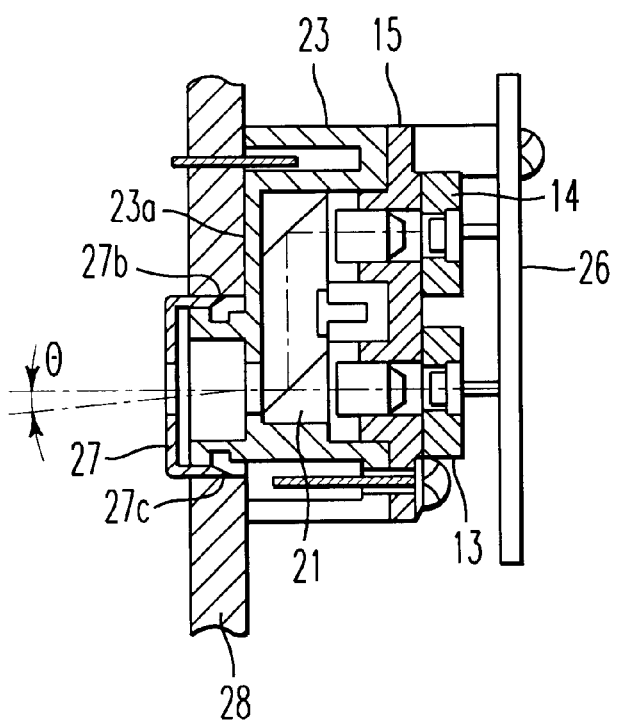
FIG. 16 is a cross-sectional view of another embodiment of the light source for Black.
Figure 17:
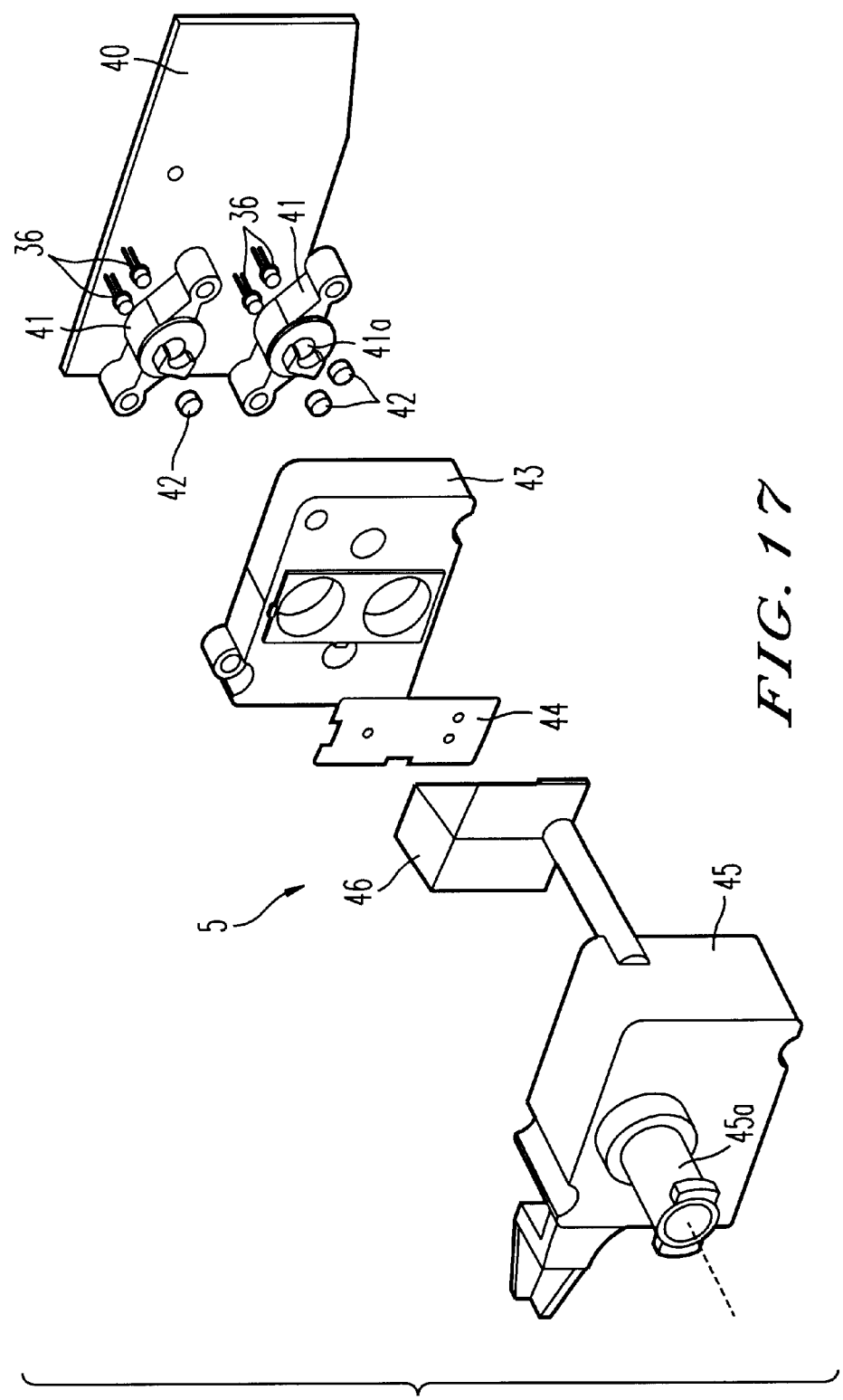
FIG. 17 is a perspective view of another embodiment of the structure of the light source that emits three light beams.

Referring to FIGS. 16 and 17, another embodiment of the structure of the light source are illustrated in perspective view. The optical unit is described below but detailed explanations of the image forming apparatus concerning the other members are omitted because they are substantially the same as the above embodiments.

Figure 18:
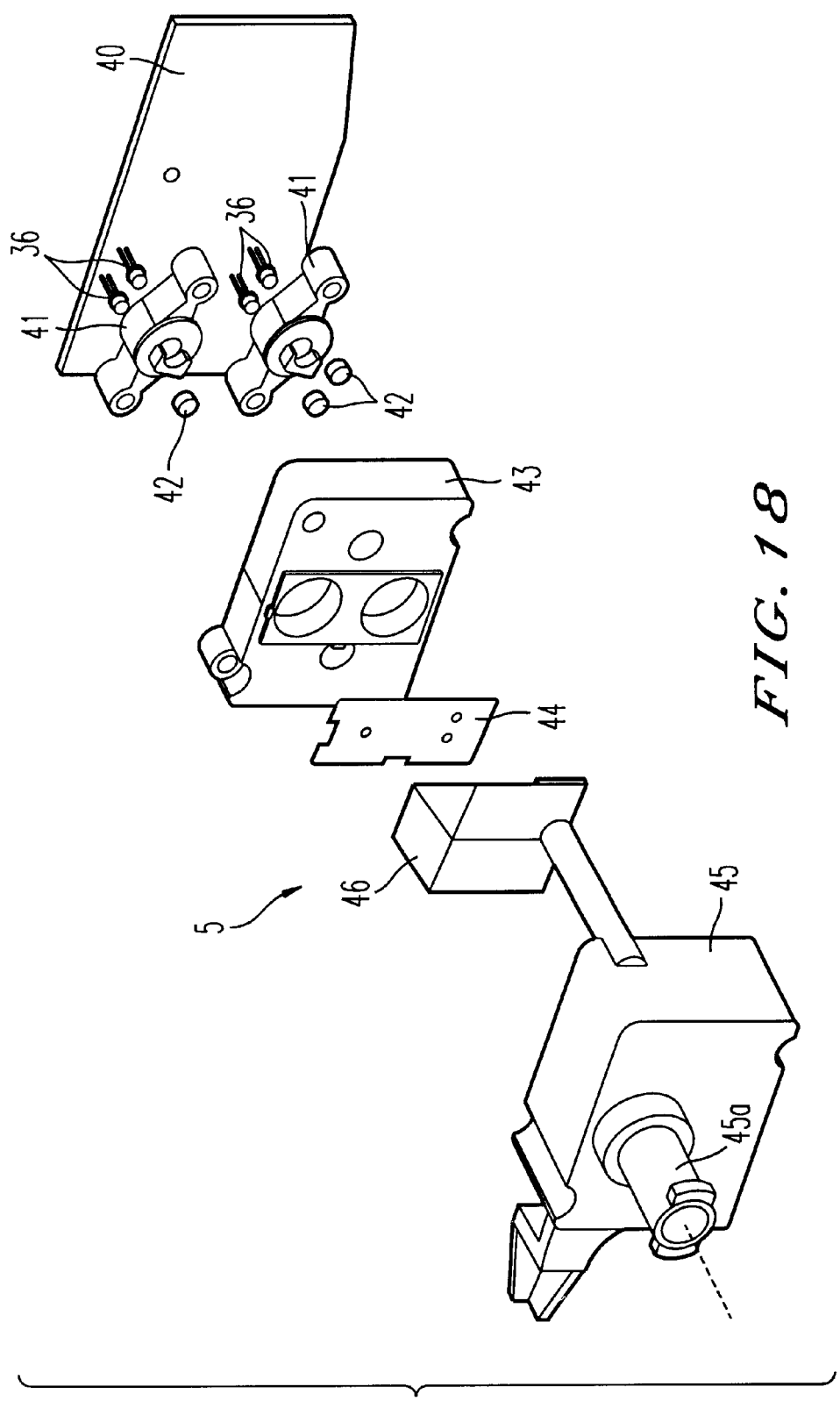
FIG. 18 is a perspective view of another embodiment of the structure of the light source that emits four light beams.

In the above embodiment, the light source for black includes two laser diodes. In this embodiment, one light source unit includes three laser diodes as shown FIG. 17 or four laser diodes as shown FIG. 18.

The overall structure of the above light sources are the same. Therefore, the user can choose one of the structures of the light sources according to the user's needs.

Figure 19:
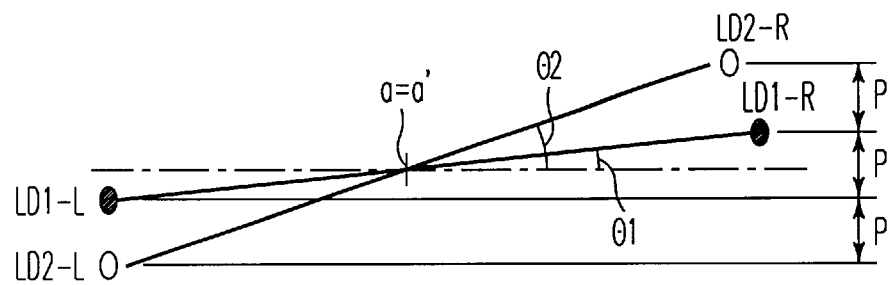
FIG. 19 illustrates a relation of beam spots on a photoconductive drum when the four light beams are emitted by the light source which described in FIG. 18.

When the light source unit employs four laser diodes, the laser spot on the photoconductive drum is shown in FIG. 19. The axis a' of one pair of light beams coincides with one of the other pair of light beams as shown FIG. 19 by the function of the prism 46. The distance from a beam spot LD1-L to a beam spot LD1-R corresponding to one of the pairs of laser diodes 36 is the same as the distance from a beam spot LD2-L to a beam spot LD2-R corresponding to the other pair of laser diodes 36. Therefore, the subscanning pitch P between each of the beam spots is capable of adjusting with rotation of one of the pairs of laser diodes 36 and the other pair of laser diodes 36 each other.

Figure 20:
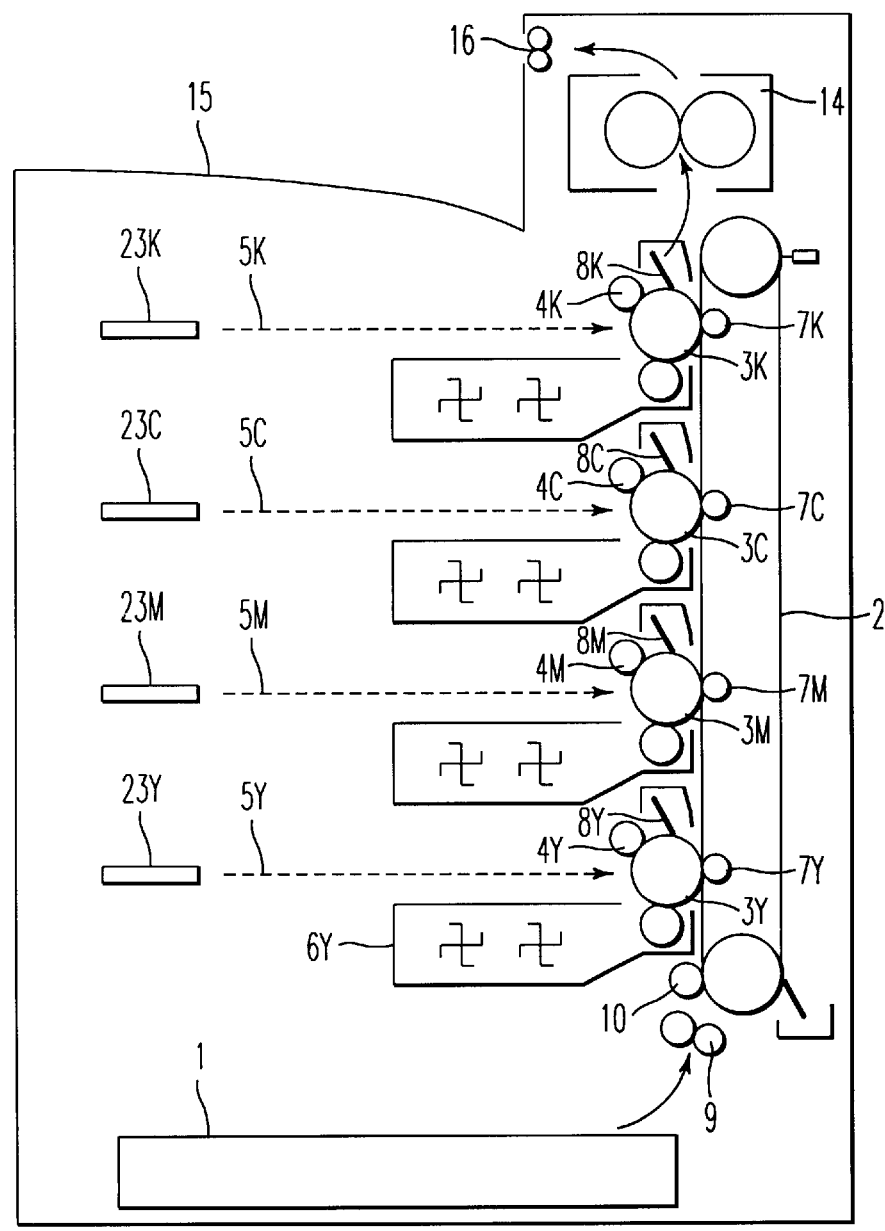
FIG. 20 is a cross-sectional view of another embodiment of the image forming apparatus according to the present invention.
Figure 21:
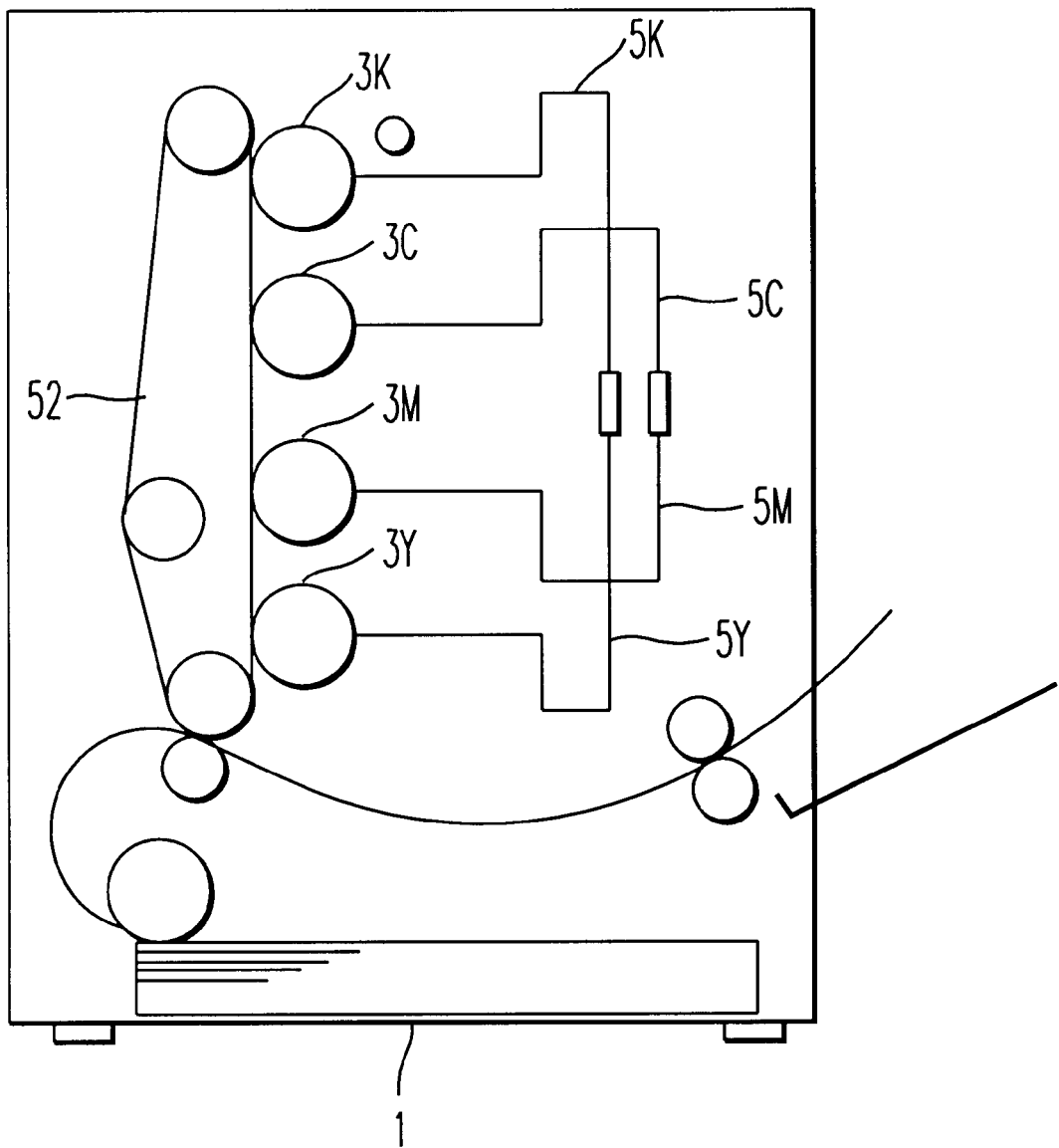
FIG. 21 is a cross-sectional view of another embodiment of the image forming apparatus according to the present invention.

Referring to FIG. 20, a further embodiment is illustrated. The optical scanning units are longitudinally mounted and a transfer belt 2 located side of the optical scanning units. With reference to FIG. 21, another embodiment of the image forming apparatus of the present invention. An intermediate transfer belt 52 is employed in the image forming apparatus. The image forming apparatus has an optical system which is the same as the first embodiment, photoconductive drums 3K, 3C, 3M and 3Y corresponding to the each light beams 5K, 5C, K5 5M and 5Y emitted from light sources each other, the intermediate transfer belt 52.

The intermediate transfer belt 52 is contacted with the each photoconductive drum and also contacted with the transfer roller at which the toner images is transferred to a paper.

This apparatus also has a light sources which is capable of changeably emitting the number of the light beams. Detailed explanations of the image forming apparatus concerning the other members are omitted because they are substantially the same as the above embodiments.

Figure 22:
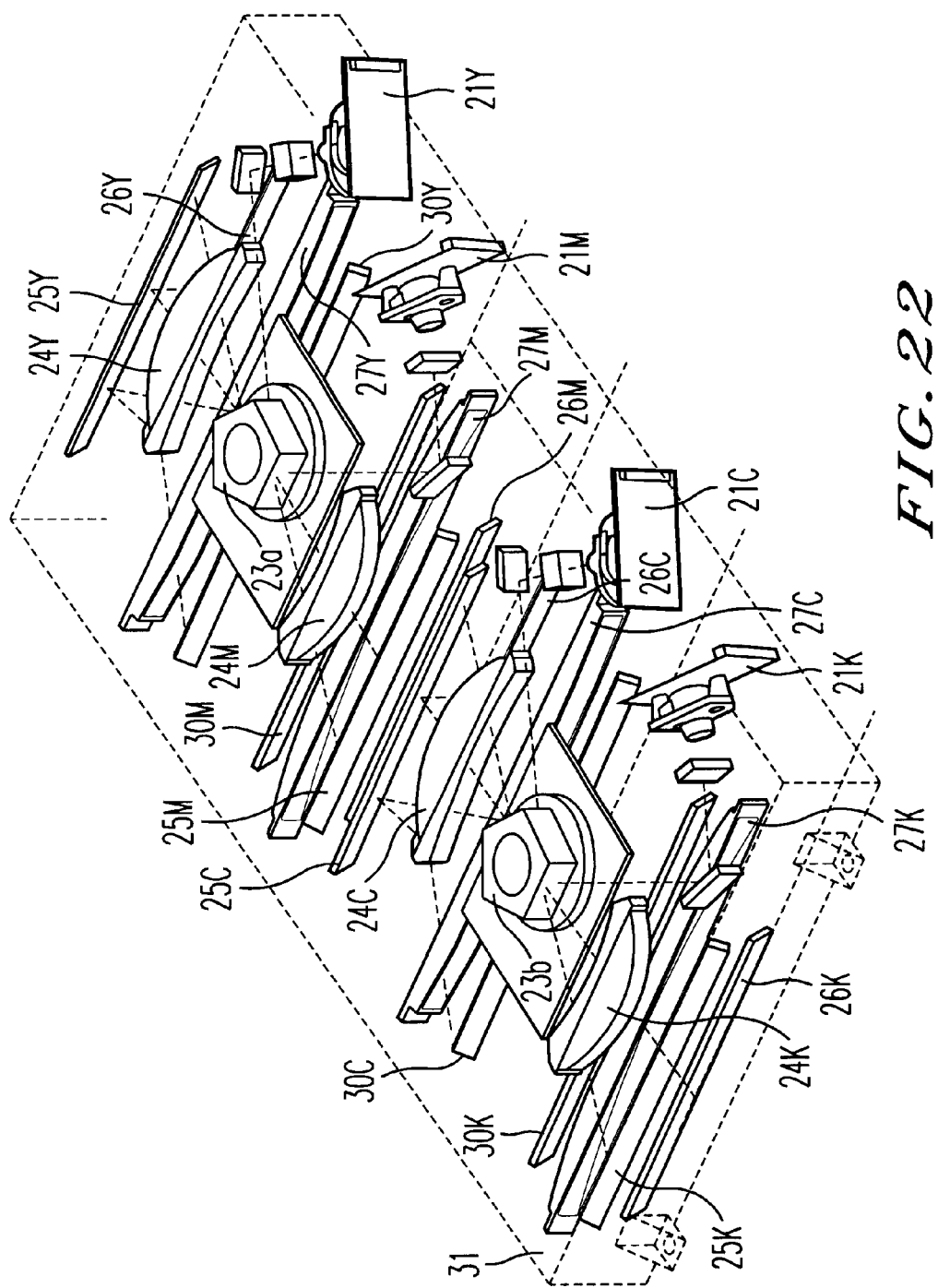
FIG. 22 is a perspective view of an optical system according to another embodiment.

Now referring to FIG. 22, another embodiment of the optical system is illustrated. A pair of polygonal mirrors 23a, 23b employed in the optical system. A pair of light sources 21Y and 21M emit an image forming light beam towards a common polygonal mirror 23a via each collimator lens.

Each of the light beams from the light source 21Y and 21M is reflected and scanned by a reflecting surface of the polygonal mirror 23a. The reflected beams are focused by a series of lenses 24Y, 27Y and 24M, 27M and the focused images are then projected downwardly by a series of mirrors for scanning the focused images in predetermined directions on a respective temporary image-forming surface. Similarly, the other pair of light sources 21C and 21K emit an image forming light beam towards a common polygon mirror 23b via each collimator lens. Each of the light beams from the light source 21C and 21K is 410 reflected and scanned by a reflecting surface of the polygon mirror 23b. The reflected beams are focused by a series of lenses 24C, 27C and 24K, 27K and the focused images are then downwardly by a series of mirrors for scanning the focused images in predetermined directions on a respective temporary image-forming surface.

As a result, the desired image is initially formed beyond or further away from the lenses and the polygon shaped mirror.

It is to be understood, however, that even though numerous characteristics and advantages of the present invention have been set forth in the foregoing description, together with details of the structure and function of the invention, the disclosure is illustrative only, and changes in detail may be made, especially in matters of shape, size and arrangement of parts, as well as implementation in software, hardware, or a combination of both within the principles of the invention to the full extent indicated by the broad general meaning of the terms in which the appended claims are expressed.

What is claimed is:

1. An optical system for an image forming apparatus, comprising:

a first light source for selectably emitting a plurality of image forming light beams based upon control signals;

a second light source for emitting a fewer number of image forming light beams than that of said first light source;

photoconductive means for forming an electrostatic latent image by said first and second light sources;

means for selecting image forming modes between a multiple color mode and a single color mode;

means for selecting the number of light beams of a predetermined light source based upon the selected image forming mode;

means for emitting the same number of light beams with said predetermined light source and other light sources when the multiple color mode is selected; and means for reflecting and scanning light from each said first and second light source onto an image-forming surface, and first and second optical devices for focusing said light;

said means for reflecting and scanning light comprising a single mirror common to each said light source and positioned between said first and second optical devices for focusing said light, wherein said single mirror and each said light source lie in substantially the same plane, wherein a rotational speed R1 of the means for reflecting and scanning is a set predetermined value as described in the following equations:

$$R1 = R2 \times (n/m) \times (M/N) \times (D1/D2) \text{ (rpm)}$$

$$m > n \geq 1 \text{ (m, n: integer)},$$

wherein R1 (rpm) is the rotational speed of the means for reflecting and scanning in the single color mode, R2 (rpm) is a rotational speed of the means for reflecting and scanning in the multiple color mode, M (mm/s) is a rotational speed of the photoconductive means in the single color mode, N (mm/s) is a rotational speed of the photoconductive means in the multiple color mode, D1 (dpi) is a recording density in the single color mode, D2 (dpi) is a recording density in the multiple color mode, "n" is a maximum number of the light beams of light sources for yellow, magenta and cyan, and "m" is a maximum number of the light beams of the light source for black, and wherein a clock frequency F1 of the image forming apparatus is set based on the following equation:

$$F1=F2\times(n/m)\times(M/N)\times(D1/D2)^2 \text{ (MHZ)},$$

where F1, F2 is the clock frequency at the single color mode and the multiple color mode, respectively.

2. The optical system according to claim 1, wherein the first light source selectably emits a plurality of light beams and a single beam.

3. The optical system according to claim 2, wherein the first light source selectively emits two beams and a single beam.

4. The optical system according to claim 1, wherein the first light source comprises a set of a plurality of laser diodes.

5. The optical system according to claim 1, wherein the first light source comprises a plurality at arrays of light-emitting diodes.

6. An image forming apparatus, comprising:

an optical system in which a first light source selectably emits image forming light beams based upon control signals and a second light source emits a lower number of image forming light beams than that of the first light source;

a plurality of photoconductive devices for forming an electrostatic latent image by said optical system;

a plurality of developing devices each of which is arranged in connection with each of the photoconductive devices for supplying a developer to each of said photoconductive devices to develop a latent images thereon;

first and second optical devices for focusing said light;

a device for reflecting and scanning light which comprises a single mirror centrally positioned between said first and second optical devices for focusing said light;

a movable sheet transfer belt contacting said photoconductive members, wherein the developing images are transferrable to an image forming medium, wherein said single mirror and each said light source lie in substantially the same plane, wherein a rotational speed R1 of the means for reflecting and scanning is a set predetermined value as described in the following equations:

$$R1=R2\times(n/m)\times(M/N)\times(D1/D2) \text{ (rpm)}$$

$$m>n\geq 1 \text{ (m, n:integer)},$$

wherein R1 (rpm) is the rotational speed of the means for reflecting and scanning in the single color mode, R2 (rpm) is a rotational speed of the means for reflecting and scanning in the multiple color mode, M (mm/s) is a rotational speed of the photoconductive means in the single color mode, N (mm/s) is a rotational speed of the photoconductive means in the multiple color mode, D1 (dpi) is a recording density in the single color mode, D2 (dpi) is a recording density in the multiple color mode, "n" is a maximum number of the light beams of light sources for yellow, magenta and cyan, and "m" is a maximum number of the light beams of the light source for black, and wherein a clock frequency F1 of the image forming apparatus is set based on the following equation:

$$F1=F2\times(n/m)\times(M/N)\times(D1/D2)^2 \text{ (MHZ)},$$

where F1, F2 is the clock frequency at the single color mode and the multiple color mode, respectively.

7. An image forming apparatus, comprising:

an optical system in which a first light source selectably emits a plurality of image forming light beams based upon control signals and a second light source is emitting a single beam;

a plurality of photoconductive devices for forming an electrostatic latent image by said optical system;

a plurality of developing devices each arranged in connection with each of the photoconductive devices for supplying a developer to each of said photoconductive devices to develop latent images thereon;

a movable sheet transfer belt contacting said photoconductive members, wherein the developed images are transferrable to an image forming medium;

means for selecting image forming modes between a multiple color mode and a single color mode;

means for selecting the number of light beams of a predetermined light source based upon the selected image forming mode;

means for emitting the same number of light beams with said predetermined light source and the other light sources when the multiple color mode is selected; and means for reflecting and scanning light from each said first and second light source onto an image-forming surface, and said means for reflecting and scanning light comprising a single mirror common to each said light source and centrally positioned between said first and second focusing means for focusing said light, wherein said single mirror and each said light source lie in substantially the same plane, wherein a rotational speed R1 of the means for reflecting and scanning is a set predetermined value as described in the following equations:

$$R1=R2\times(n/m)\times(M/N)\times(D1/D2) \text{ (rpm)}$$

$$m>n\geq 1 \text{ (m, n:integer)},$$

wherein R1 (rpm) is the rotational speed of the means for reflecting and scanning in the single color mode, R2 (rpm) is a rotational speed of the means for reflecting and scanning in the multiple color mode, M (mm/s) is a rotational speed of the photoconductive means in the single color mode, N (mm/s) is a rotational speed of the photoconductive means in the multiple color mode, D1 (dpi) is a recording density in the single color mode, D2 (dpi) is a recording density in the multiple color mode, "n" is a maximum number of the light beams of light sources for yellow, magenta and cyan, and "m" is a maximum number of the light beams of the light source for black, and wherein a clock frequency F1 of the image forming apparatus is set based on the following equation:

$$F1 = F2 \times (n/m) \times (M/N) \times (D1/D2)^2 \text{ (MHZ)},$$

where F1, F2 is the clock frequency at the single color mode and the multiple color mode, respectively.

8. An image forming apparatus, comprising:

an optical system in which a first light source selectably emits a plurality of image forming light beams based upon control signals and a second light source emits a lower number of image forming light beams than that of the first light source;

a plurality of photoconductive devices for forming an electrostatic latent image by said optical system;

a plurality of developing devices each arranged in connection with each of the photoconductive devices for supplying a developer to each of said photoconductive devices to develop latent images thereon;

a movable intermediate transfer belt contacting said photoconductive members, wherein the developed images may be transferred to said transfer belt;

a transfer member for contacting with a sheet, wherein the intermediate transferred images are transferrable to an image forming medium;

means for selecting image forming modes between a multiple color mode and a single color mode;

means for selecting the number of light beams of a predetermined light source based upon the selected image forming mode;

means for emitting the same number of light beams with said predetermined light source and the other light sources when the multiple color mode is selected; and means for reflecting and scanning light from each said first and second light source onto an image-forming surface, and first and second focusing means for focusing said light;

said means for reflecting and scanning light comprising a single mirror common to each said light source and centrally positioned between said first and second focusing means for focusing said light, wherein said single mirror and each said light source lie in substantially the same plane, wherein a rotational speed R1 of the means for reflecting and scanning is a set predetermined value as described in the following equations:

$$R1 = R2 \times (n/m) \times (M/N) \times (D1/D2) \text{ (rpm)}$$

$$m > n \geq 1 \text{ (m, n:integer)},$$

wherein R1 (rpm) is the rotational speed of the means for reflecting and scanning in the single color mode, R2 (rpm) is a rotational speed of the means for reflecting and scanning in the multiple color mode, M (mm/s) is a rotational speed of the photoconductive means in the single color mode, N (mm/s) is a rotational speed of the photoconductive means in the multiple color mode, D1 (dpi) is a recording density in the single color mode, D2 (dpi) is a recording density in the multiple color mode, "n" is a maximum number of the light beams of light sources for yellow, magenta and cyan, and "m" is a maximum number of the light beams of the light source for black, and wherein a clock frequency F1 of the image forming apparatus is set based on the following equation:

$$F1 = F2 \times (n/m) \times (M/N) \times (D1/D2)^2 \text{ (MHZ)},$$

where F1, F2 is the clock frequency at the single color mode and the multiple color mode, respectively.

9. An image forming apparatus, comprising:

an optical system in which a first light source selectably emits a plurality of image forming light beams based upon control signals and a second light source emits a single beam;

a plurality of photoconductive devices for forming an electrostatic latent image by said optical system;

a plurality of developing devices each arranged in connection with each of the photoconductive devices for supplying a developer to each of said photoconductive devices to develop latent images thereon;

a movable intermediate transfer belt contacting said photoconductive members, wherein the developed images are transferrable to said transfer belt;

a transfer member for contacting with a sheet wherein the intermediate transferred images are transferrable to an image forming medium;

means for selecting image forming modes between a multiple color mode and a single color mode;

means for selecting the number of light beams of a predetermined light source based upon the selected image forming mode;

means for emitting the same number of light beams with said predetermined light source and the other light sources when the multiple color mode is selected; and means for reflecting and scanning light from each said first and second light source onto an image-forming surface, and first and second focusing means for focusing said light;

said means for reflecting and scanning light comprising a single mirror common to each said light source and positioned between said first and second focusing means for focusing said light, wherein said single mirror and each said light source lie in substantially the same plane, wherein a rotational speed R1 of the means for reflecting and scanning is a set predetermined value as described in the following equations:

$$R1 = R2 \times (n/m) \times (M/N) \times (D1/D2) \text{ (rpm)}$$

$$m > n \geq 1 \text{ (m, n:integer)},$$

wherein R1 (rpm) is the rotational speed of the means for reflecting and scanning in the single color mode, R2 (rpm) is a rotational speed of the means for reflecting and scanning in the multiple color mode, M (mm/s) is a rotational speed of the photoconductive means in the single color mode, N (mm/s) is a rotational speed of the photoconductive means in the multiple color mode, D1 (dpi) is a recording density in the single color mode, D2 (dpi) is a recording density in the multiple color mode, "n" is a maximum number of the light beams of light sources for yellow, magenta and cyan, and "m" is a maximum number of the light beams of the light source for black, and wherein a clock frequency F1 of the image forming apparatus is set based on the following equation:

$$F1=F2\times(n/m)\times(M/N)\times(D1/D2)^2 \text{ (MHZ)},$$

where F1, F2 is the clock frequency at the single color mode and the multiple color mode, respectively.

10. An image forming apparatus, comprising:

first light source means for selectably emitting a plurality of image forming light beams based upon control signals;

second light source means for emitting a plurality of image forming light beams which is less than that of the first light source means;

photoconductive means for forming an electrostatic latent image by said first light source means and said second light source means;

developing means for developing the electrostatic latent image of said photoconductive means thereon;

sheet transfer means for transferring an image forming medium to which the developed image is transferred;

means for selecting image forming modes between a multiple color mode and a single color mode;

means for selecting the number of light beams of a predetermined light source based upon the selected image forming mode;

means for emitting the same number of light beams with said predetermined light source and the other light sources when the multiple color mode is selected; and means for reflecting and scanning light from each said first and second light source means onto an image-forming surface, and said means for reflecting and scanning light comprising a single mirror common to each said light source means and centrally positioned between said first and second means for focusing said light, wherein said single mirror and each said first and second light source means lie in substantially the same plane, wherein a rotational speed R1 of the means for reflecting and scanning is a set predetermined value as described in the following equations:

$$R1=R2\times(n/m)\times(M/N)\times(D1/D2) \text{ (rpm)}$$

$$m>n\geq 1 \text{ (m, n:integer)},$$

wherein R1 (rpm) is the rotational speed of the means for reflecting and scanning in the single color mode, R2 (rpm) is a rotational speed of the means for reflecting and scanning in the multiple color mode, M (mm/s) is a rotational speed of the photoconductive means in the single color mode, N (mm/s) is a rotational speed of the photoconductive means in the multiple color mode, D1 (dpi) is a recording density in the single color mode, D2 (dpi) is a recording density in the multiple color mode, "n" is a maximum number of the light beams of light sources for yellow, magenta and cyan, and "m" is a maximum number of the light beams of the light source for black, and wherein a clock frequency F1 of the image forming apparatus is set based on the following equation:

$$F1=F2\times(n/m)\times(M/N)\times(D1/D2)^2 \text{ (MHZ)},$$

where F1, F2 is the clock frequency at the single color mode and the multiple color mode, respectively.

11. An image forming apparatus, comprising:

first light source means for selectably emitting a plurality of image forming light beams based upon control signals;

second light source means for emitting a single beam;

photoconductive means for forming an electrostatic latent image by said first light source means and said second light source means;

developing means for developing the electrostatic latent image of said photoconductive means thereon;

a sheet transfer means for transferring an image forming medium to which the developed image transferred;

means for selecting image forming modes between a multiple color mode and a single color mode;

means for selecting the number of light beams of a predetermined light source means based upon the selected image forming mode;

means for emitting the same number of light beams with said predetermined light source means and the other light source means when the multiple color mode is selected; and means for reflecting and scanning light from each said first and second light source means onto an image-forming surface, first and second focusing means for focusing said light beams;

said means for reflecting and scanning light comprising a single mirror common to each said light source means and centrally positioned between said first and second focusing means for focusing said light beams, wherein said single mirror and each said light source means lie in substantially the same plane, wherein a rotational speed R1 of the means for reflecting and scanning is a set predetermined value as described in the following equations:

$$R1=R2\times(n/m)\times(M/N)\times(D1/D2) \text{ (rpm)}$$

$$m>n\geq 1 \text{ (m, n:integer)},$$

wherein R1 (rpm) is the rotational speed of the means for reflecting and scanning in the single color mode, R2 (rpm) is a rotational speed of the means for reflecting and scanning in the multiple color mode, M (mm/s) is a rotational speed of the photoconductive means in the single color mode, N (mm/s) is a rotational speed of the photoconductive means in the multiple color mode, D1 (dpi) is a recording density in the single color mode, D2 (dpi) is a recording density in the multiple color mode, "n" is a maximum number of the light beams of light sources for yellow, magenta and cyan, and "m" is a maximum number of the light beams of the light source for black, and wherein a clock frequency F1 of the image forming apparatus is set based on the following equation:

$$F1=F2\times(n/m)\times(M/N)\times(D1/D2)^2 \text{ (MHZ)},$$

where F1, F2 is the clock frequency at the single color mode and the multiple color mode, respectively.

12. An image forming apparatus, comprising:

first light source means for selectably emitting a plurality of image forming light beams based upon control signals;

second light source means for emitting a plurality of image forming light beams less than that of the first light source means;

photoconductive means for forming an electrostatic latent image by said first light source means and said second light source means;

developing means for developing the electrostatic latent image of said photoconductive means thereon;

an intermediate transfer means for transferring the developed images to transfer means; and transfer means for transferring the intermediate transferred images to an image forming medium;

first and second focusing means for focusing said light beams; and means for reflecting and scanning light comprising a single mirror common to each said light source means and centrally positioned between said first and second focusing means for focusing said light, wherein said single mirror and each said light source means lie in substantially the same plane, wherein a rotational speed R1 of the means for reflecting and scanning is a set predetermined value as described in the following equations:

$$R1 = R2 \times (n/m) \times (M/N) \times (D1/D2) \text{ (rpm)}$$

$$m > n \geq 1 \text{ (m, n:integer)},$$

wherein R1 (rpm) is the rotational speed of the means for reflecting and scanning in the single color mode, R2 (rpm) is a rotational speed of the means for reflecting and scanning in the multiple color mode, M (mm/s) is a rotational speed of the photoconductive means in the single color mode, N (mm/s) is a rotational speed of the photoconductive means in the multiple color mode, D1 (dpi) is a recording density in the single color mode, D2 (dpi) is a recording density in the multiple color mode, "n" is a maximum number of the light beams of light sources for yellow, magenta and cyan, and "m" is a maximum number of the light beams of the light source for black, and wherein a clock frequency F1 of the image forming apparatus is set based on the following equation:

$$F1 = F2 \times (n/m) \times (M/N) \times (D1/D2)^2 \text{ (MHZ)},$$

where F1, F2 is the clock frequency at the single color mode and the multiple color mode, respectively.

13. An image forming apparatus, comprising:

first light source means for selectably emitting a plurality of image forming light beams based upon control signals;

second light source means for emitting a single beam;

photoconductive means for forming an electrostatic latent image by said first light source means and said second light source means;

developing means for developing said electrostatic latent images of the photoconductive devices thereon;

movable intermediate transfer means for being transferred to the developed images;

transfer means for transferring said intermediate transferred images to an image forming medium;

means for selecting image forming modes between a multiple color mode and a single color mode;

means for selecting the number of light beams of a predetermined light source based upon the selected image forming mode;

means for emitting and collimating the same number of light beams with said predetermined light source means and the other light sources means when the multiple color mode is selected; and means for reflecting and scanning light from each said first and second light source onto an image-forming surface, and first and second focusing means for focusing said light beams;

said means for reflecting and scanning light comprising a single mirror common to each said light source means and centrally positioned between said first and second focusing means for focusing said light, wherein said single mirror and each said light source means lie in substantially the same plane, wherein a rotational speed R1 of the means for reflecting and scanning is a set predetermined value as described in the following equations:

$$R1 = R2 \times (n/m) \times (M/N) \times (D1/D2) \text{ (rpm)}$$

$$m > n \geq 1 \text{ (m, n:integer)},$$

wherein R1 (rpm) is the rotational speed of the means for reflecting and scanning in the single color mode, R2 (rpm) is a rotational speed of the means for reflecting and scanning in the multiple color mode, M (mm/s) is a rotational speed of the photoconductive means in the single color mode, N (mm/s) is a rotational speed of the photoconductive means in the multiple color mode, D1 (dpi) is a recording density in the single color mode, D2 (dpi) is a recording density in the multiple color mode, "n" is a maximum number of the light beams of light sources for yellow, magenta and cyan, and "m" is a maximum number of the light beams of the light source for black, and wherein a clock frequency F1 of the image forming apparatus is set based on the following equation:

$$F1 = F2 \times (n/m) \times (M/N) \times (D1/D2)^2 \text{ (MHZ)},$$

where F1, F2 is the clock frequency at the single color mode and the multiple color mode, respectively.

14. A method of image forming process; comprising the steps of:

selecting image forming modes between a multiple color mode and single color mode;

selecting the number of light beams of predetermined light source based upon the selected image forming mode;

emitting same number of light beams with said predetermined light source and the other light sources when the multiple color mode is selected;

reflecting and scanning light from each said light source onto an image forming surface by use of said mirror;

positioning said single mirror and each said light source so as to be located in substantially the same plane; and forming an electrostatic image with photoconductive means, wherein a rotational speed R1 of the means for reflecting and scanning is a set predetermined value as described in the following equations:

$$R1 = R2 \times (n/m) \times (M/N) \times (D1/D2) \text{ (rpm)}$$

$$m > n \geq 1 \text{ (m, n:integer)},$$

wherein R1 (rpm) is the rotational speed of the means for reflecting and scanning in the single color mode, R2 (rpm) is a rotational speed of the means for reflecting and scanning in the multiple color mode, M (mm/s) is a rotational speed of the photoconductive means in the single color mode, N (mm/s) is a rotational speed of the photoconductive means in the multiple color mode, D1 (dpi) is a recording density in the single color mode, D2 (dpi) is a recording density in the multiple color mode, "n" is a maximum number of the light beams of light sources for yellow, magenta and cyan, and "m" is a maximum number of the light beams of the light source for black, and wherein a clock frequency F1 of the image forming apparatus is set based on the following equation:

$$F1 = F2 \times (n/m) \times (M/N) \times (D1/D2)^2 \text{ (MHZ)},$$

where F1, F2 is the clock frequency at the single color mode and the multiple color mode, respectively.

15. The method of image forming process according to claim 14, further comprising of:

emitting a plurality of light beams from said predetermined light source of a greater number than that of the other light source.

16. A method of image forming process, comprising the steps of:

selecting image forming modes between a multiple color mode and a single color mode;

selecting the number of light beams of a predetermined light source based upon the selected image forming mode;

emitting the same number of light beams with said predetermined light source and the other light sources when the multiple color mode is selected;

emitting a plurality of light beams from said predetermined light source of a number greater than that of the other light source;

positioning a single mirror common to each of said light source centrally thereof;

reflecting and scanning light from each said light source onto an image forming surface by use of a single mirror common to each said light source;

forming an electrostatic latent image with photoconductive means;

developing the latent images;

transferring the developed images to an image forming medium; and positioning said single mirror and each said light sources so as to be located in substantially the same plane, wherein a rotational speed R1 of the means for reflecting and scanning is a set predetermined value as described in the following equations:

$$R1 = R2 \times (n/m) \times (M/N) \times (D1/D2) \text{ (rpm)}$$

$$m > n \geq 1 \text{ (m, n:integer)},$$

wherein R1 (rpm) is the rotational speed of the means for reflecting and scanning in the single color mode, R2 (rpm) is a rotational speed of the means for reflecting and scanning in the multiple color mode, M (mm/s) is a rotational speed of the photoconductive means in the single color mode, N (mm/s) is a rotational speed of the photoconductive means in the multiple color mode, D1 (dpi) is a recording density in the single color mode, D2 (dpi) is a recording density in the multiple color mode, "n" is a maximum number of the light beams of light sources for yellow, magenta and cyan, and "m" is a maximum number of the light beams of the light source for black, and wherein a clock frequency F1 of the image forming apparatus is set based on the following equation:

$$F1 = F2 \times (n/m) \times (M/N) \times (D1/D2)^2 \text{ (MHZ)},$$

where F1, F2 is the clock frequency at the single color mode and the multiple color mode, respectively.

17. A method of image forming process, comprising the steps of:

selecting image forming modes between a multiple color mode and a single color mode;

selecting the number of light beams of a predetermined light source based upon the selected image forming mode;

emitting the same number of light beams with said predetermined light source and the other light sources when the multiple color mode is selected;

emitting a plurality of light beams from said predetermined light source of a number greater than that of the other light source;

positioning a single mirror common to each said light source and centrally of said light sources;

reflecting and scanning light from each said light source onto an image forming surface by use of said mirror;

forming an electrostatic latent image with photoconductive means;

developing the latent images;

transferring the developed images to an intermediate transfer device; and transferring the images on said intermediate transferred images to an image forming medium; and positioning said single mirror and each of said light source so as to be located in substantially the same plane, wherein a rotational speed R1 of the means for reflecting and scanning is a set predetermined value as described in the following equations:

$$R1 = R2 \times (n/m) \times (M/N) \times (D1/D2) \text{ (rpm)}$$

$$m > n \geq 1 \text{ (m, n:integer)},$$

wherein R1 (rpm) is the rotational speed of the means for reflecting and scanning in the single color mode, R2 (rpm) is a rotational speed of the means for reflecting and scanning in the multiple color mode, M (mm/s) is a rotational speed of the photoconductive means in the single color mode, N (mm/s) is a rotational speed of the photoconductive means in the multiple color mode, D1 (dpi) is a recording density in the single color mode, D2 (dpi) is a recording density in the multiple color mode, "n" is a maximum number of the light beams of light sources for yellow, magenta and cyan, and "m" is a maximum number of the light beams of the light source for black, and wherein a clock frequency F1 of the image forming apparatus is set based on the following equation:

$$F1=F2\times(n/m)\times(M/N)\times(D1/D2)^2 \text{ (MHZ)},$$

where F1, F2 is the clock frequency at the single color mode and the multiple color mode, respectively.

18. An optical system for an image forming apparatus, comprising:

a first light source for selectably emitting a plurality of image forming light beams based upon control signals;

a second light source for emitting a fewer number of image forming light beams than that of said first light source;

a plurality of photoconductive devices for forming an electrostatic image by said first and second light sources;

a device for selecting image forming modes between a multiple color mode and a single color mode;

a device for selecting the number of light beams of a predetermined light source based upon the selected image forming mode;

a device for emitting the same number of light beams with said predetermined light source and the other light sources when the multiple color mode is selected; and a single mirror common to said light sources and positioned centrally thereof;

a device for reflecting and scanning light from each said light source onto an image-forming surface, said device for reflecting and scanning light comprising said single mirror, wherein said single mirror and each said light source lie in substantially the same plane, wherein a rotational speed R1 of the means for reflecting and scanning is a set predetermined value as described in the following equations:

$$R1=R2\times(n/m)\times(M/N)\times(D1/D2) \text{ (rpm)}$$

$$m>n\geq 1 \text{ (m, n:integer)},$$

wherein R1 (rpm) is the rotational speed of the means for reflecting and scanning in the single color mode, R2 (rpm) is a rotational speed of the means for reflecting and scanning in the multiple color mode, M (mm/s) is a rotational speed of the photoconductive means in the single color mode, N (mm/s) is a rotational speed of the photoconductive means in the multiple color mode, D1 (dpi) is a recording density in the single color mode, D2 (dpi) is a recording density in the multiple color mode, "n" is a maximum number of the light beams of light sources for yellow, magenta and cyan, and "m" is a maximum number of the light beams of the light source for black, and wherein a clock frequency F1 of the image forming apparatus is set based on the following equation:

$$F1=F2\times(n/m)\times(M/N)\times(D1/D2)^2 \text{ (MHZ)},$$

where F1, F2 is the clock frequency at the single color mode and the multiple color mode, respectively.

19. An image forming apparatus, comprising:

an optical system in which a first light source for selectably emitting a plurality of image forming light beams based upon control signals;

a second light source for emitting a fewer number of image forming light beams than that of the first light source;

a plurality of photoconductive devices for forming an electrostatic latent image by said optical system;

a plurality of developing devices each of which is arranged in connection with each of the photoconductive devices for supplying a developer to each of said photoconductive devices to develop a latent images thereon;

a movable sheet transfer belt contacting said photoconductive members, wherein the developing images are transferrable to an image forming medium;

a device for selecting image forming modes between a multiple color mode and a single color mode;

a device for selecting the number of light beams of a predetermined light source based upon the selected image forming mode;

a device for emitting the same number of light beams with the said predetermined light for reflecting and scanning light from each said light source onto an image-forming surface, a single mirror common to said light sources and positioned centrally thereof said device for reflecting and scanning light comprising said single mirror, wherein said single mirror and each of said light source lie in substantially the same plane, wherein a rotational speed R1 of the means for reflecting and scanning is a set predetermined value as described in the following equations:

$$R1=R2\times(n/m)\times(M/N)\times(D1/D2) \text{ (rpm)}$$

$$m>n\geq 1 \text{ (m, n:integer)},$$

wherein R1 (rpm) is the rotational speed of the means for reflecting and scanning in the single color mode, R2 (rpm) is a rotational speed of the means for reflecting and scanning in the multiple color mode, M (mm/s) is a rotational speed of the photoconductive means in the single color mode, N (mm/s) is a rotational speed of the photoconductive means in the multiple color mode, D1 (dpi) is a recording density in the single color mode, D2 (dpi) is a recording density in the multiple color mode, "n" is a maximum number of the light beams of light sources for yellow, magenta and cyan, and "m" is a maximum number of the light beams of the light source for black, and wherein a clock frequency F1 of the image forming apparatus is set based on the following equation:

$$F1=F2\times(n/m)\times(M/N)\times(D1/D2)^2 \text{ (MHZ)},$$

where F1, F2 is the clock frequency at the single color mode and the multiple color mode, respectively.

20. An image forming apparatus, comprising:

an optical system in which a first light source selectably emits a plurality of image forming light beams based upon control signals and a second light source is emitting a single beam;

a plurality of photoconductive devices for forming an electrostatic latent image by said optical system;

a plurality of developing devices each arranged in connection with each of the photoconductive devices for supplying a developer to each of said photoconductive devices to develop latent images thereon;

a movable sheet transfer belt contacting said photoconductive members, wherein the developed images are transferrable to an image forming medium;

a device for selecting image forming modes between a multiple color mode and a single color mode;

a device for selecting the number of light beams of a predetermined light source based upon the selected image forming mode;

a device for emitting and collimating the same number of light beams with said predetermined light source and the other light sources when the multiple color mode is selected;

a single mirror common to said light sources and positioned centrally thereof; a device for reflecting and scanning light from each said first and second light source onto an image-forming surface, said device for reflecting and scanning light comprising said single mirror, wherein said single mirror and each said light source lie in substantially the same plane, wherein a rotational speed R1 of the means for reflecting and scanning is a set predetermined value as described in the following equations:

$$R1 = R2 \times (n/m) \times (M/N) \times (D1/D2) \text{ (rpm)}$$

$$m > n \geq 1 \text{ (m, n:integer)},$$

wherein R1 (rpm) is the rotational speed of the means for reflecting and scanning in the single color mode, R2 (rpm) is a rotational speed of the means for reflecting and scanning in the multiple color mode, M (mm/s) is a rotational speed of the photoconductive means in the single color mode, N (mm/s) is a rotational speed of the photoconductive means in the multiple color mode, D1 (dpi) is a recording density in the single color mode, D2 (dpi) is a recording density in the multiple color mode, "n" is a maximum number of the light beams of light sources for yellow, magenta and cyan, and "m" is a maximum number of the light beams of the light source for black, and wherein a clock frequency F1 of the image forming apparatus is set based on the following equation:

$$F1 = F2 \times (n/m) \times (M/N) \times (D1/D2)^2 \text{ (MHZ)},$$

where F1, F2 is the clock frequency at the single color mode and the multiple color mode, respectively.

21. An image forming apparatus, comprising:

an optical system in which a first light source selectably emits a plurality of image forming light beams based upon control signals and a second light source emits a lower number of image forming light beams than that of the first light source;

a plurality of photoconductive devices for forming an electrostatic latent image by said optical system;

a plurality of developing devices respectively arranged in connection with each of the photoconductive devices for supplying a developer to each of said photoconductive devices to develop latent images thereon;

a movable intermediate transfer belt contacting said photoconductive members, wherein the developed images may be transferred to said transfer belt;

a transfer member for contacting with a sheet, wherein the intermediate transferred images are transferable to an image forming medium;

a device for selecting image forming modes between a multiple color mode and a single color mode;

a device for selecting the number of light beams of a predetermined light source based upon the selected image forming mode;

a device for emitting and collimating the same number of light beams with said predetermined light source and the other light sources when the multiple color mode is selected; and a single mirror common to said light sources and positioned centrally thereof; a device for reflecting and scanning light from each said light source onto an image-forming surface, said device for reflecting and scanning light comprising said single mirror, wherein said single mirror and each said light source lie in substantially the same plane.

wherein a rotational speed R1 of the means for reflecting and scanning is a set predetermined value as described in the following equations:

$$R1 = R2 \times (n/m) \times (M/N) \times (D1/D2) \text{ (rpm)}$$

$$m > n \geq 1 \text{ (m, n:integer)},$$

wherein R1 (rpm) is the rotational speed of the means for reflecting and scanning in the single color mode, R2 (rpm) is a rotational speed of the means for reflecting and scanning in the multiple color mode, M (mm/s) is a rotational speed of the photoconductive means in the single color mode, N (mm/s) is a rotational speed of the photoconductive means in the multiple color mode, D1 (dpi) is a recording density in the single color mode, D2 (dpi) is a recording density in the multiple color mode, "n" is a maximum number of the light beams of light sources for yellow, magenta and cyan, and "m" is a maximum number of the light beams of the light source for black, and wherein a clock frequency F1 of the image forming apparatus is set based on the following equation:

$$F1 = F2 \times (n/m) \times (M/N) \times (D1/D2)^2 \text{ (MHZ)},$$

where F1, F2 is the clock frequency at the single color mode and the multiple color mode, respectively.

22. An image forming apparatus, comprising:

an optical system in which a first light source selectably omits a plurality of image forming light beams based upon control signals and a second light source emits a single beam;

a plurality of photoconductive devices for forming an electrostatic latent image by said optical system:

a plurality of developing devices each arranged in connection with each of the photoconductive devices for supplying a developer to each of said photoconductive devices to develop latent images thereon;

a movable intermediate transfer belt contacting said photoconductive members, wherein the developed images are transferrable to said transfer bell;

a transfer member for contacting with a sheet wherein the intermediate transferred images are transferrable to an image forming medium;

a device for selecting image forming modes between a multiple color mode and a single color mode;

a device for selecting the number of light beams of a predetermined light source based upon the selected image forming mode;

a device for emitting the same number of light beams with said predetermined light source and the other light sources when the multiple color mode is selected; and a single mirror common to said light sources and positioned centrally thereof; a device for reflecting and scanning light from each said light source onto an image-forming surface, said device for reflecting and scanning light comprising said single mirror, wherein said single mirror and each said light source lie in substantially the same plane, wherein a rotational speed R1 of the means for reflecting and scanning is a set predetermined value as described in the following equations:

$$R1=R2\times(n/m)\times(M/N)\times(D1/D2) \text{ (rpm)}$$

$$m>n\geq 1 \text{ (m, n:integer)},$$

wherein R1 (rpm) is the rotational speed of the means for reflecting and scanning in the single color mode, R2 (rpm) is a rotational speed of the means for reflecting and scanning in the multiple color mode, M (mm/s) is a rotational speed of the photoconductive means in the single color mode, N (mm/s) is a rotational speed of the photoconductive means in the multiple color mode, D1 (dpi) is a recording density in the single color mode, D2 (dpi) is a recording density in the multiple color mode, "n" is a maximum number of the light beams of light sources for yellow, magenta and cyan, and "m" is a maximum number of the light beams of the light source for black, and wherein a clock frequency F1 of the image forming apparatus is set based on the following equation:

$$F1=F2\times(n/m)\times(M/N)\times(D1/D2)^2 \text{ (MHZ)},$$

where F1, F2 is the clock frequency at the single color mode and the multiple color mode, respectively.

23. An image forming apparatus, comprising:

a first light source for selectably emitting a plurality of image forming light beams based upon control signals;

a second light source for emitting a plurality of image forming light beams which is less than that of the first light source means;

a photoconductive device for forming an electrostatic latent image by said first light source and said second light source;

a developing device for developing the electrostatic latent image of said photoconductive device thereon;

a sheet transfer device for transferring an image forming medium to which the developed image is transferred;

a device for selecting image forming modes between a multiple color mode and a single color mode;

a device for selecting the number of light beams of a predetermined light source basal upon the selected image forming mode;

a device for emitting the same number of light beams with said predetermined light source and the other light sources when the multiple color mode is selected; and a single mirror common to said light sources and positioned centrally thereof; a device for reflecting and scanning light from each said light source onto an image-forming surface, said device for reflecting and scanning light comprising said mirror, wherein said single mirror and each said light source lie in substantially the same plane, wherein a rotational speed R1 of the means for reflecting and scanning is a set predetermined value as described in the following equations:

$$R1=R2\times(n/m)\times(M/N)\times(D1/D2) \text{ (rpm)}$$

$$m>n\geq 1 \text{ (m, n:integer)},$$

wherein R1 (rpm) is the rotational speed of the means for reflecting and scanning in the single color mode, R2 (rpm) is a rotational speed of the means for reflecting and scanning in the multiple color mode, M (mm/s) is a rotational speed of the photoconductive means in the single color mode, N (mm/s) is a rotational speed of the photoconductive means in the multiple color mode, D1 (dpi) is a recording density in the single color mode, D2 (dpi) is a recording density in the multiple color mode, "n" is a maximum number of the light beams of light sources for yellow, magenta and cyan, and "m" is a maximum number of the light beams of the light source for black, and wherein a clock frequency F1 of the image forming apparatus is set based on the following equation:

$$F1=F2\times(n/m)\times(M/N)\times(D1/D2)^2 \text{ (MHZ)},$$

where F1, F2 is the clock frequency at the single color mode and the multiple color mode, respectively.

24. An image forming apparatus, comprising:

a first light source device for selectively emitting a plurality of image forming light beams based upon control signals;

a second light source device for emitting a single beam;

a photoconductive device for forming an electrostatic latent image by said first light source and said second light source;

a developing device for developing the electrostatic latent image of said photoconductive device thereon;

a sheet transfer device for transferring an image forming medium to which the developed image transferred;

a device for selecting image forming modes between a multiple color mode and a single color mode;

a device for selecting the number of light beams of a predetermined light source based upon the selected image forming mode;

a device for emitting the same number of light beams with said predetermined light source and the other light sources when the multiple color mode is selected; and a single mirror common to said light sources and positioned centrally thereof;

a device for reflecting and scanning light from each said light source onto an image-forming surface, said device for reflecting and scanning light comprising said single mirror, wherein said single mirror and each said light source lie in substantially the same plane, wherein a rotational speed R1 of the means for reflecting and scanning is a set predetermined value as described in the following equations:

$$R1 = R2 \times (n/m) \times (M/N) \times (D1/D2) \text{ (rpm)}$$

$$m > n \geq 1 \text{ (m, n:integer)},$$

wherein R1 (rpm) is the rotational speed of the means for reflecting and scanning in the single color mode, R2 (rpm) is a rotational speed of the means for reflecting and scanning in the multiple color mode, M (mm/s) is a rotational speed of the photoconductive means in the single color mode, N (mm/s) is a rotational speed of the photoconductive means in the multiple color mode, D1 (dpi) is a recording density in the single color mode, D2 (dpi) is a recording density in the multiple color mode, "n" is a maximum number of the light beams of light sources for yellow, magenta and cyan, and "m" is a maximum number of the light beams of the light source for black, and wherein a clock frequency F1 of the image forming apparatus is set based on the following equation:

$$F1 = F2 \times (n/m) \times (M/N) \times (D1/D2)^2 \text{ (MHZ)},$$

where F1, F2 is the clock frequency at the single color mode and the multiple color mode, respectively.

25. An image forming apparatus, comprising:

a first light source device for selectably emitting a plurality of image forming light beams based upon control signals;

a second light Source device for emitting a single beam;

a photoconductive device or forming an electrostatic latent image by said first light source said second light source a developing device for developing said electrostatic latent images of the photoconductive devices thereon;

a movable intermediate transfer device for being transferred to the developed images;

a transfer device for transferring said intermediate transferred images to an image forming medium;

a device for selecting image forming modes between a multiple color mode and a single color mode;

a device for selecting the number of light beams of a predetermined light source based upon the selected image forming mode;

a device for emitting the same number of light beams with said predetermined light Source and the other light sources when the multiple color mode is selected;

a single mirror common to said light sources and positioned centrally thereof; and a device for reflecting and scanning light from each said light source onto an image-forming surface, said device for reflecting and scanning light comprising said single mirror, wherein said single mirror and each said light source lie in substantially the same plane, wherein a rotational speed R1 of the means for reflecting and scanning is a set predetermined value as described in the following equations:

$$R1 = R2 \times (n/m) \times (M/N) \times (D1/D2) \text{ (rpm)}$$

$$m > n \geq 1 \text{ (m, n:integer)},$$

wherein R1 (rpm) is the rotational speed of the means for reflecting and scanning in the single color mode, R2 (rpm) is a rotational speed of the means for reflecting and scanning in the multiple color mode, M (mm/s) is a rotational speed of the photoconductive means in the single color mode, N (mm/s) is a rotational speed of the photoconductive means in the multiple color mode, D1 (dpi) is a recording density in the single color mode, D2 (dpi) is a recording density in the multiple color mode, "n" is a maximum number of the light beams of light sources for yellow, magenta and cyan, and "m" is a maximum number of the light beams of the light source for black, and wherein a clock frequency F1 of the image forming apparatus is set based on the following equation:

$$F1 = F2 \times (n/m) \times (M/N) \times (D1/D2)^2 \text{ (MHZ)},$$

where F1, F2 is the clock frequency at the single color mode and the multiple color mode, respectively.

* * * * *